(12) United States Patent
Yanai et al.

(10) Patent No.: US 11,054,561 B2
(45) Date of Patent: *Jul. 6, 2021

(54) OPTICAL ELEMENT AND SENSOR

(71) Applicant: FUJIFILM Corporation, Tokyo (JP)

(72) Inventors: Yujiro Yanai, Minamiashigara (JP); Michio Nagai, Minamiashigara (JP); Hiroshi Sato, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/913,858

(22) Filed: Jun. 26, 2020

(65) Prior Publication Data
US 2020/0326462 A1 Oct. 15, 2020

Related U.S. Application Data

(63) Continuation of application No. PCT/JP2018/048334, filed on Dec. 27, 2018.

(30) Foreign Application Priority Data

Dec. 27, 2017 (JP) .............................. JP2017-250970

(51) Int. Cl.
G02B 5/30 (2006.01)
G01S 17/931 (2020.01)
(Continued)

(52) U.S. Cl.
CPC .......... *G02B 5/3016* (2013.01); *G01S 7/4814* (2013.01); *G01S 7/4816* (2013.01); *G01S 17/10* (2013.01); *G01S 17/931* (2020.01)

(58) Field of Classification Search
CPC ..... G02B 5/3016; G01S 17/931; G01S 17/10; G01S 7/4814; G01S 7/4816
(Continued)

(56) References Cited

U.S. PATENT DOCUMENTS

2016/0109630 A1* 4/2016 Ichihashi ............... G02B 5/208
250/338.1
2018/0109630 A1 4/2018 Ichihashi
(Continued)

FOREIGN PATENT DOCUMENTS

JP 9-127235 A 5/1997
JP 2004-309618 A 11/2004
(Continued)

OTHER PUBLICATIONS

International Preliminary Report on Patentability and Written Opinion of the International Searching Authority, with an English translation, dated Jul. 9, 2020, for International Application No. PCT/JP2016/046334.
(Continued)

Primary Examiner — Nathanael R Briggs
Assistant Examiner — William D Peterson
(74) Attorney, Agent, or Firm — Birch, Stewart, Kolasch & Birch, LLP

(57) ABSTRACT

An object is to provide an optical element that is thin and can gather and reflect light in a specific wavelength range in a predetermined direction, and a sensor including the above-described optical element. The optical element includes a cholesteric liquid crystal layer, in which the cholesteric liquid crystal layer has a liquid crystal alignment pattern in which a direction of an optical axis derived from a liquid crystal compound changes while continuously rotating in at least one in-plane direction, and in a case where a length over which the direction of the optical axis rotates by 180° in the in-plane direction in which the direction of the optical axis changes while continuously rotating is set as a single period, the cholesteric liquid crystal layer has in-plane regions having different lengths of the single periods in the liquid crystal alignment pattern.

9 Claims, 10 Drawing Sheets

(51) Int. Cl.
*G01S 7/481* (2006.01)
*G01S 17/10* (2020.01)

(58) Field of Classification Search
USPC .......................................... 349/194
See application file for complete search history.

(56) References Cited

U.S. PATENT DOCUMENTS

| | | | | |
|---|---|---|---|---|
| 2018/0164480 A1* | 6/2018 | Yoshida | ............... | G02B 5/0252 |
| 2019/0088788 A1 | 3/2019 | Katoh et al. | | |
| 2019/0317352 A1* | 10/2019 | Saitoh | ...................... | G02B 5/20 |
| 2020/0326579 A1* | 10/2020 | Sato | ...................... | G02B 27/02 |

FOREIGN PATENT DOCUMENTS

| | | |
|---|---|---|
| JP | 2008-83010 A | 4/2008 |
| WO | WO 2014/203986 A1 | 12/2014 |
| WO | WO 2016/194890 A1 | 12/2016 |
| WO | WO 2016/194961 A1 | 12/2016 |
| WO | WO 2017/199812 A1 | 11/2017 |

OTHER PUBLICATIONS

International Search Report, dated Feb. 5, 2019, for International Application No. PCT/JP2016/048334, with an English translation.

* cited by examiner

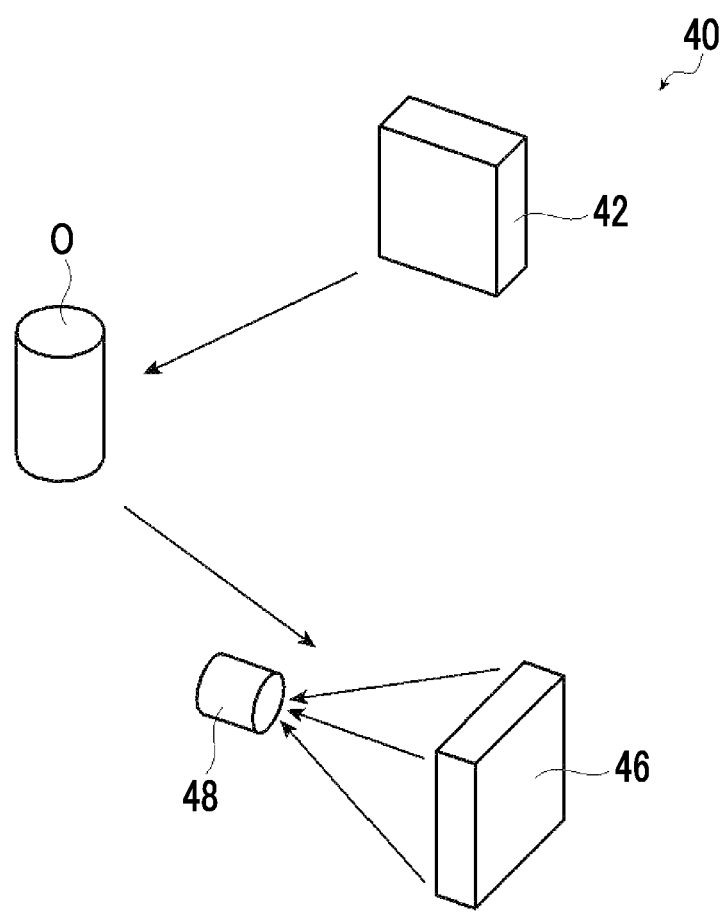

OPTICAL ELEMENT AND SENSOR

CROSS-REFERENCE TO RELATED APPLICATIONS

This application is a Continuation of PCT International Application No. PCT/JP2018/048334 filed on Dec. 27, 2018, which claims priority under 35 U.S.C. § 119(a) to Japanese Patent Application No. 2017-250970 filed on Dec. 27, 2017. The above application is hereby expressly incorporated by reference, in its entirety, into the present application.

BACKGROUND OF THE INVENTION

1. Field of the Invention

The present invention relates to an optical element that reflects light and a sensor that is formed of the optical element.

2. Description of the Related Art

In an automobile, a robot, a drone (a multicopter or an unmanned aircraft), an alarm system, or the like, a sensor that performs detection of an object, measurement of a distance from an object, and the like is provided.

In this sensor, infrared light is used as a light source in order to reduce noise generated from natural light such as sunlight.

For example, JP1997-127235A (JP-H9-127235A) describes a light gathering structure of a laser radar distance measuring device for a vehicle that irradiates an object such as a surrounding obstacle with infrared light (infrared laser light) from an automobile such that infrared light as a parallel ray parallel to a horizontal surface that is reflected from the object is gathered to a light-receiving element (light receiving sensor) by a holographic lens provided in a light-transmitting body of the automobile. In the light gathering structure, the light-receiving element is disposed at a distal convergence point distant from the holographic lens among two convergence points generated by astigmatism of the holographic lens. In the vicinity of the light-receiving element, a plane mirror and a concave mirror are disposed, the plane mirror being disposed on a parallel line that passes through the distal convergence point and is parallel to the holographic lens, and the concave mirror converging light reflected from the plane mirror to the light-receiving element.

In the sensor, as a method of irradiating an object with infrared light, a method of two-dimensionally scanning infrared light by allowing a light deflector such as a polygon mirror to scan light from a light source in one direction and subsequently allowing a micro electromechanical system (MEMS) mirror or the like to scan the light in a direction perpendicular to the one direction is known.

However, in this configuration, deterioration of a driver portion is severe, and there is also a problem in vibration resistance and the like. Further, in an automobile, a robot, a drone, or the like, it is required to provide a sensor in a narrow place. In this configuration, however, the device configuration is complicated and thus is large-sized. Therefore, the installation place of the sensor is largely limited.

On the other hand, as a sensor in which the above-described problem is solved, a configuration in which an object is irradiated with light from a plane light source that emits infrared light such that the light reflected from the object is received by a light-receiving element (infrared camera) that measures infrared light.

SUMMARY OF THE INVENTION

In the configuration in which a plane light source is used, it is not necessary to scan light, the device can be simplified and reduced in size.

In this configuration, however, since a plane light source is used, the amount of light incident into a light-receiving element is insufficient, and there is a problem in that a signal-to-noise ratio (SN ratio) is low.

In order to solve this problem, a method of using a concave mirror as disclosed in JP1997-127235A (JP-H9-127235A) is also disclosed. However, in a concave mirror, in order to obtain sufficient light gathering power, it is necessary to increase a curvature of a concave surface. As a result, the mirror becomes thick. Therefore, the sensor is also large such that it is difficult to provide the sensor in a narrow place.

Further, in a concave mirror or the like that allows light to be incident into a light-receiving element, external light, such as sunlight other than infrared light as measurement light, that is incident into the sensor is reflected from the light-receiving element and is incident into the concave mirror.

In general, a light-receiving element that measures infrared light also has sensitivity to visible light other than infrared light. Therefore, in a case where external light is incident into the light-receiving element, the external light becomes noise such that a SN ratio also decreases. In addition, by providing a filter such as a band pass filter or a high pass filter in an optical path of infrared light, noise generated by external light can be reduced. However, since the filter is provided, the configuration of the sensor is complicated accordingly, and the size thereof is large.

An object of the present invention is to solve the above-described problem in the related art and to provide an optical element that is thin and can gather and reflect only light in a desired wavelength range in a predetermined direction, and a sensor including the optical element.

In order to achieve the object, the present invention has the following configurations.

[1] An optical element comprising:

a cholesteric liquid crystal layer that is obtained by immobilizing a cholesteric liquid crystalline phase, in which the cholesteric liquid crystal layer has a liquid crystal alignment pattern in which a direction of an optical axis derived from a liquid crystal compound changes while continuously rotating in at least one in-plane direction, and in a case where, in the liquid crystal alignment pattern of the cholesteric liquid crystal layer, a length over which the direction of the optical axis derived from the liquid crystal compound rotates by 180° in the in-plane direction in which the direction of the optical axis derived from the liquid crystal compound changes while continuously rotating is set as a single period, the cholesteric liquid crystal layer has in-plane regions having different lengths of the single periods in the liquid crystal alignment pattern.

[2] The optical element according to [1], in which in at least one of an upstream direction or an downstream direction in the in-plane direction in which the direction of the optical axis derived from the liquid crystal compound changes while continuously rotating, the length of the single period in the liquid crystal alignment pattern of the cholesteric liquid crystal layer gradually decreases.

[3] The optical element according to [2],
in which in a direction toward an outside of the cholesteric liquid crystal layer, the length of the single period in the liquid crystal alignment pattern of the cholesteric liquid crystal layer gradually decreases.

[4] The optical element according to any one of [1] to [3],
in which in the in-plane direction in which the direction of the optical axis derived from the liquid crystal compound changes while continuously rotating, the cholesteric liquid crystal layer has regions in which rotation directions of the optical axis derived from the liquid crystal compound are opposite to each other.

[5] The optical element according to any one of [1] to [4],
in which the liquid crystal alignment pattern of the cholesteric liquid crystal layer is a concentric circular pattern having a concentric circular shape where the in-plane direction in which the direction of the optical axis derived from the liquid crystal compound changes while continuously rotating moves from an inside toward an outside.

[6] The optical element according to any one of [1] to [5],
in which the cholesteric liquid crystal layer has a selective reflection center wavelength in an infrared range.

[7] The optical element according to any one of [1] to [6] comprising cholesteric liquid crystal layers that have the same selective reflection center wavelength and different turning directions of circularly polarized light to be reflected.

[8] The optical element according to [7],
in which in the cholesteric liquid crystal layers having the same selective reflection center wavelength and different turning directions of circularly polarized light to be reflected, rotation directions in which the direction of the optical axis derived from the liquid crystal compound is continuous in the liquid crystal alignment pattern are different from each other.

[9] A sensor comprising:
the optical element according to any one of [1] to [8];
a light source; and
a light-receiving element.

[10] The sensor according to [9], comprising:
an absorber that absorbs at least a part of light transmitted through the optical element.

[11] The sensor according to [9] or [10],
in which the light source emits a pulse wave.

The optical element according to the present invention is thin and can gather and reflect only light in a desired wavelength range such as infrared light in a predetermined direction. In addition, in the sensor according to the present invention including the above-described optical element is a high-performance sensor that is small, has a simple device configuration, and has reduced noise generated from external light or the like.

BRIEF DESCRIPTION OF THE DRAWINGS

FIG. 11 is a conceptual diagram showing one example of a sensor according to the present invention.

DESCRIPTION OF THE PREFERRED EMBODIMENTS

Figure 1:
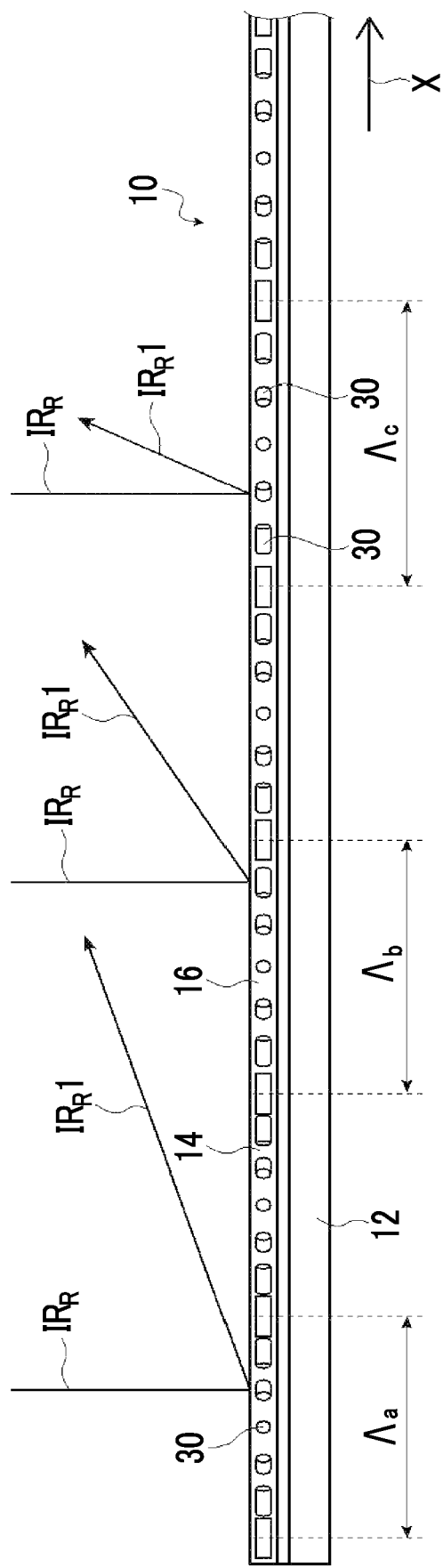
FIG. 1 is a diagram conceptually showing an example of an optical element according to the present invention.

Hereinafter, an optical element and a sensor according to an embodiment of the present invention will be described in detail based on a preferable embodiment shown in the accompanying drawings.

In this specification, numerical ranges represented by "to" include numerical values before and after "to" as lower limit values and upper limit values.

In this specification, "(meth)acrylate" represents "either or both of acrylate and methacrylate".

In this specification, the meaning of "the same" includes a case where an error range is generally allowable in the technical field. In addition, in this specification, the meaning of "all", "entire", or "entire surface" includes not only 100% but also a case where an error range is generally allowable in the technical field, for example, 99% or more, 95% or more, or 90% or more.

In this specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light. However, although not limited thereto, in invisible light, an ultraviolet ray (ultraviolet light) refers to light in a wavelength range of 200 nm or longer and shorter than 420 nm, and an infrared ray (infrared light) refers to light in a wavelength range of longer than 780 nm and 12000 nm or shorter.

In this specification, a selective reflection center wavelength refers to an average value of two wavelengths at which, in a case where a minimum value of a transmittance of a target object (member) is represented by $T_{min}$ (%), a half value transmittance: $T½$ (%) represented by the following expression is exhibited.

Expression for obtaining Half Value Transmittance:
$T½=100-(100-T_{min})\div2$

In addition, selective reflection center wavelengths of a plurality of layers being "equal" does not represent that the selective reflection center wavelengths are exactly equal, and error is allowed in a range where there are no optical effects. Specifically, selective reflection center wavelengths of a plurality of objects being "equal" represents a difference between the selective reflection center wavelengths of the respective objects is 20 nm or less, and this difference is preferably 15 nm or less and more preferably 10 nm or less.

The optical element according to the embodiment of the present invention is a light reflection element that reflects incident light and includes a cholesteric liquid crystal layer obtained by immobilizing a cholesteric liquid crystalline phase.

In the optical element according to the embodiment of the present invention, the cholesteric liquid crystal layer has a liquid crystal alignment pattern in which a direction of an optical axis derived from a liquid crystal compound continuously rotates in one in-plane direction. In a case where, in the liquid crystal alignment pattern, a length over which the direction of the optical axis derived from the liquid crystal compound rotates by 180° in the in-plane direction in which the direction of the optical axis derived from the liquid crystal compound changes while continuously rotating is set as a single period, the cholesteric liquid crystal layer has in-plane regions having different lengths of the single periods in the liquid crystal alignment pattern.

Although described in detail below, the optical element according to the embodiment of the present invention has the above-described configuration such that only light in a desired wavelength range can be gathered and reflected in a predetermined direction.

FIG. 1 is a diagram conceptually showing an example of the optical element according to the embodiment of the present invention.

An optical element 10 shown in the drawing includes a support 12, an alignment film 14, and a cholesteric liquid crystal layer 16. The cholesteric liquid crystal layer 16 is a layer obtained by immobilizing a cholesteric liquid crystalline phase and has, for example, a selective reflection center wavelength in an infrared wavelength range. That is, the optical element 10 is a light reflection element that selectively reflects infrared light and allows transmission of the other light.

<Support>

In the optical element 10, the support 12 supports the alignment film 14 and the cholesteric liquid crystal layer 16.

As the support 12, various sheet-shaped materials (films or plate-shaped materials) can be used as long as they can support the alignment film 14 and the cholesteric liquid crystal layer 16.

In addition, the support 12 may be transparent or opaque.

The thickness of the support 12 is not particularly limited and may be appropriately set depending on the use of the optical element 10, a material for forming the support 12, and the like in a range where the alignment film 14 and the cholesteric liquid crystal layer 16 can be supported.

The thickness of the support 12 is preferably 5 to 5000 µm, more preferably 10 to 1000 µm, and still more preferably 15 to 500 µm.

The support 12 may have a single-layer structure or a multi-layer structure.

In a case where the support 12 has a single-layer structure, examples thereof include supports 12 formed of glass, triacetyl cellulose (TAC), polyethylene terephthalate (PET), polycarbonates, polyvinyl chloride, acryl, polyolefin, and the like. In a case where the support 12 has a multi-layer structure, examples thereof include a support including: one of the above-described supports having a single-layer structure that is provided as a substrate; and another layer that is provided on a surface of the substrate.

<Alignment Film>

In the optical element 10, the alignment film 14 is formed on a surface of the support 12.

During the formation of the cholesteric liquid crystal layer 16, the alignment film 14 aligns a liquid crystal compound 30 for forming the cholesteric liquid crystal layer 16 to a predetermined liquid crystal alignment pattern.

Although not described below, in the optical element 10 according to the embodiment of the present invention, the cholesteric liquid crystal layer 16 has a liquid crystal alignment pattern in which a direction of an optical axis 30A (refer to FIG. 3) derived from the liquid crystal compound 30 changes while continuously rotating in one in-plane direction (in the drawing, an arrow X direction).

Further, in a case where, in the liquid crystal alignment pattern, a length over which the direction of the optical axis 30A rotates by 180° in the in-plane direction in which the direction of the optical axis 30A changes while continuously rotating is set as a length Λ of a single period (a rotation period of the optical axis), the cholesteric liquid crystal layer 16 has regions having different lengths Λ of the single period. The optical element 10 shown in the drawing has a liquid crystal alignment pattern in which the length Λ of the single period gradually decreases in a direction opposite to the in-plane direction (the arrow X direction described below) in which the direction of the optical axis 30A changes while continuously rotating.

Accordingly, the alignment film 14 is formed such that the cholesteric liquid crystal layer 16 can form the liquid crystal alignment pattern.

In the following description, "the direction of the optical axis 30A rotates" will also be referred to as "the optical axis 30A rotates".

As the alignment film 14, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as w-tricosanoic acid, dioctadecylmethylammonium chloride, or methyl stearate.

The alignment film 14 formed by a rubbing treatment can be formed by rubbing a surface of a polymer layer with paper or fabric in a given direction multiple times.

As the material used for the alignment film 14, for example, a material for forming polyimide, polyvinyl alcohol, a polymer having a polymerizable group described in JP1997-152509A (JP-H9-152509A), or a vertical alignment film such as JP2005-097377A, JP2005-099228A, and JP2005-128503A is preferable. The vertical alignment film described in the present invention refers to an alignment film in which a major axis of a molecule of a rod-shaped liquid crystal compound is aligned to be substantially perpendicular to a rubbing direction of the vertical alignment film.

In the optical element 10 according to the embodiment of the present invention, for example, the alignment film 14 can be suitably used as a so-called photo-alignment film obtained by irradiating a photo-alignable material with polarized light or non-polarized light. That is, in the optical element 10 according to the embodiment of the present invention, a photo-alignment film that is formed by applying a photo-alignable material to the support 12 is suitably used as the alignment film 14.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate (cinnamic acid) compound, a chalcone compound, or a phosphorus compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film 14 is not limited. Any one of various well-known methods corresponding to a material for forming the alignment film 14 can be used. For example, a method including: applying the alignment film 14 to a surface of the support 12; drying the applied alignment film 14; and exposing the alignment film 14 to laser light to form an alignment pattern can be used.

Figure 8:
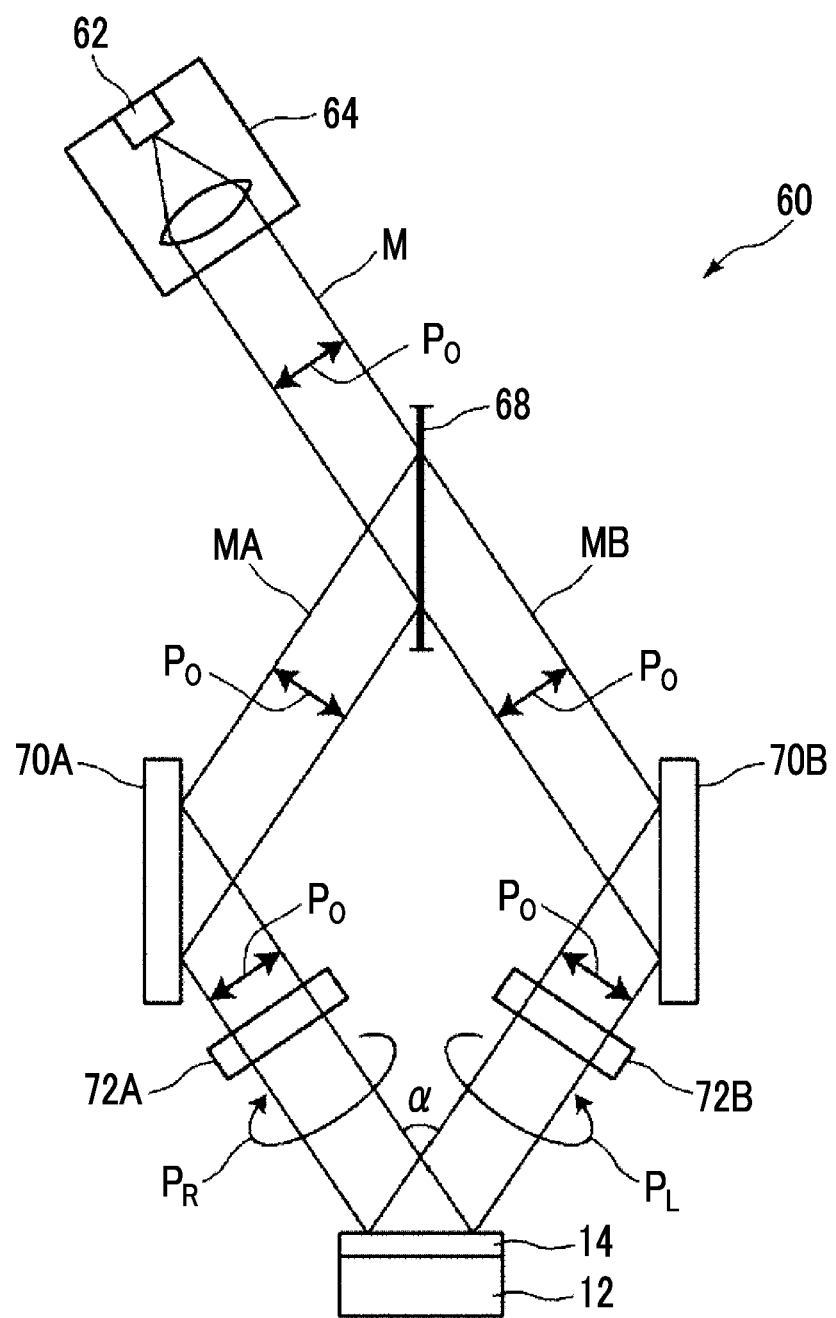
FIG. 8 is a conceptual diagram showing one example of an exposure device that exposes an alignment film of the optical element shown in FIG. 1.

FIG. 8 conceptually shows an example of an exposure device that exposes the alignment film 14 to form an alignment pattern.

An exposure device 60 shown in FIG. 8 includes: a light source 64 that includes a semiconductor laser 62; a beam splitter 68 that splits laser light M emitted from the semiconductor laser 62 into two beams MA and MB; mirrors 70A and 70B that are disposed on optical paths of the splitted two beams MA and MB; and λ/4 plates 72A and 72B.

Although not shown in the drawing, the light source 64 includes a polarizing plate and emits linearly polarized light $P_0$. The λ/4 plates 72A and 72B has optic axes perpendicular to each other. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 12 including the alignment film 14 on which the liquid crystal alignment pattern is not yet formed is disposed at an exposed portion, the two beams MA and MB intersect and interfere each other on the alignment film 14, and the alignment film 14 is irradiated with and exposed to the interference light.

Due to the interference at this time, the polarization state of light with which the alignment film 14 is irradiated periodically changes according to interference fringes. As a result, in the alignment film 14, an alignment pattern in which the alignment state periodically changes can be obtained.

By forming the cholesteric liquid crystal layer on the alignment film having the alignment pattern in which the alignment state periodically changes, as described below, the cholesteric liquid crystal layer 16 having the liquid crystal alignment pattern in which the optical axis 30A derived from the liquid crystal compound 30 continuously rotates in the in-plane direction can be formed.

In addition, by rotating the polarization direction of the laser light M emitted from the light source 64 by 90°, the rotation direction of the optical axis 30A can be reversed.

Here, in the exposure device 60, by changing an intersection angle α between the two beams MA and MB, the length Λ of the period of the liquid crystal alignment pattern can be adjusted. That is, by adjusting the intersection angle α in the exposure device 60, in the liquid crystal alignment pattern in which the optical axis 30A derived from the liquid crystal compound 30 continuously rotates in the in-plane direction, the length Λ of the single period over which the optical axis 30A rotates by 180° in the in-plane direction in which the optical axis 30A rotates can be adjusted.

Accordingly, by repeating an operation of adjusting the intersection angle α according to a desired length Λ of the single period, covering regions other than a region having the length Λ of the single period with a mask or the like, and exposing the alignment film 14, the alignment film 14 having an alignment pattern that has regions having different lengths Λ of the single period, that is, the cholesteric liquid crystal layer 16 having the liquid crystal alignment pattern can be formed.

In the optical element according to the embodiment of the present invention, the alignment film is provided as a preferable aspect and is not an essential component.

For example, the following configuration can also be adopted, in which, by forming the alignment pattern on the support 12 using a method of rubbing the support 12, a method of processing the support 12 with laser light or the like, or the like, the cholesteric liquid crystal layer 16 or the like has the liquid crystal alignment pattern in which the direction of the optical axis 30A derived from the liquid crystal compound 30 changes while continuously rotating in at least one in-plane direction.

<Cholesteric Liquid Crystal Layer>

In the optical element 10, the cholesteric liquid crystal layer 16 is formed on a surface of the alignment film 14.

In FIG. 1, in order to simplify the drawing and to clarify the configuration of the optical element 10, only the liquid crystal compound 30 (liquid crystal compound molecules) on the surface of the alignment film 14 in the cholesteric liquid crystal layer 16 is shown. However, as conceptually shown in FIG. 2, the cholesteric liquid crystal layer 16 has a helical structure in which the liquid crystal compound 30 is helically turned and laminated as in a cholesteric liquid crystal layer obtained by immobilizing a typical cholesteric liquid crystalline phase. In the helical structure, a configuration in which the liquid crystal compound 30 is helically rotated once (rotated by 360) is set as one helical pitch, and plural pitches of the helically turned liquid crystal compound 30 are laminated.

The cholesteric liquid crystal layer 16 has wavelength selective reflection properties.

In the optical element 10 shown in the drawing, for example, the cholesteric liquid crystal layer 16 reflects right circularly polarized light $IR_R$ of infrared light and allows transmission of the other light. Therefore, the cholesteric liquid crystal layer 16 has a selective reflection center wavelength in an infrared wavelength range.

For example, in a case where the optical element 10 according to the embodiment of the present invention is used for a sensor using infrared light, examples of the cholesteric liquid crystal layer include the cholesteric liquid crystal layer 16 that reflects right circularly polarized light $IR_R$ in 850 nm±50 nm having little component in sunlight and allows transmission of the other light, the cholesteric liquid crystal layer 16 that reflects right circularly polarized light $IR_R$ in 940 nm±50 nm and allows transmission of the other light, the cholesteric liquid crystal layer 16 that reflects right circularly polarized light $IR_R$ in 1150 nm±50 nm and allows transmission of the other light, and the cholesteric liquid crystal layer 16 that reflects right circularly polarized light $IR_R$ in 1400 nm±50 nm and allows transmission of the other light.

In the optical element according to the embodiment of the present invention, the cholesteric liquid crystal layer is not limited to a cholesteric liquid crystal layer that reflects right circularly polarized light $IR_R$ of infrared light and allows transmission of the other light, and may be a cholesteric liquid crystal layer that reflect right circularly polarized light of red light and allow transmission of the other light, a cholesteric liquid crystal layer that reflect right circularly polarized light of green light and allow transmission of the other light, a cholesteric liquid crystal layer that reflect right circularly polarized light of blue light and allow transmission of the other light, or a cholesteric liquid crystal layer that reflect right circularly polarized light of ultraviolet light and allow transmission of the other light. Further, in the optical element according to the embodiment of the present invention, the cholesteric liquid crystal layer may reflect left circularly polarized light instead of reflecting the right circularly polarized light.

As described above, the cholesteric liquid crystal layer 16 is obtained by immobilizing a cholesteric liquid crystalline phase.

That is, the cholesteric liquid crystal layer 16 is a layer formed of the liquid crystal compound 30 (liquid crystal material) having a cholesteric structure.

<<Cholesteric Liquid Crystalline Phase>>

It is known that the cholesteric liquid crystalline phase exhibits selective reflection properties at a specific wavelength. The center wavelength λ of selective reflection (selective reflection center wavelength λ) depends on a pitch P (=helical cycle) of a helical structure in the cholesteric liquid crystalline phase and satisfies a relationship of $\lambda = n \times P$ with an average refractive index n of the cholesteric liquid crystalline phase. Therefore, the selective reflection center wavelength can be adjusted by adjusting the pitch of the helical structure. The pitch of the cholesteric liquid crystalline phase depends on the kind of a chiral agent which is used in combination of a liquid crystal compound during the formation of the cholesteric liquid crystal layer, or the concentration of the chiral agent added. Therefore, a desired pitch can be obtained by adjusting the kind and concentration of the chiral agent.

The details of the adjustment of the pitch can be found in "Fuji Film Research&Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

Reflected light of the cholesteric liquid crystalline phase is circularly polarized light. That is, in the optical element 10 according to the embodiment of the present invention, the cholesteric liquid crystal layer 16 reflects circularly polarized light. Whether or not the reflected light is right circularly polarized light or left circularly polarized light is determined depending on a helical twisting direction (sense) of the cholesteric liquid crystalline phase. Regarding the selective reflection of the circularly polarized light by the cholesteric liquid crystalline phase, in a case where the helical twisting direction of the cholesteric liquid crystalline phase is right, right circularly polarized light is reflected, and in a case where the helical twisting direction of the cholesteric liquid crystalline phase is left, left circularly polarized light is reflected.

Accordingly, in the optical element 10 shown in the drawing, the cholesteric liquid crystal layer 16 is a layer obtained by immobilizing a right-twisted cholesteric liquid crystalline phase.

A turning direction of the cholesteric liquid crystalline phase can be adjusted by adjusting the kind of the liquid crystal compound that forms the cholesteric liquid crystal layer 16 and/or the kind of the chiral agent to be added.

In addition, a half-width Δλ (nm) of a selective reflection range (circularly polarized light reflection range) where selective reflection is exhibited depends on Δn of the cholesteric liquid crystalline phase and the helical pitch P and complies with a relationship of $\Delta\lambda = \Delta n \times P$. Therefore, the width of the selective reflection range can be controlled by adjusting Δn. Δn can be adjusted by adjusting a kind of a liquid crystal compound for forming the cholesteric liquid crystal layer 16 and a mixing ratio thereof, and a temperature during alignment immobilization.

<<Method of Forming Cholesteric Liquid Crystal Layer>>

The cholesteric liquid crystal layer 16 can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the aligned state is not changed by an external field or an external force.

The structure in which a cholesteric liquid crystalline phase is immobilized is not particularly limited as long as the optical characteristics of the cholesteric liquid crystalline phase are maintained, and the liquid crystal compound 30 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer 16 obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

——Polymerizable Liquid Crystal Compound——

The polymerizable liquid crystal compound may be a rod-shaped liquid crystal compound or a disk-shaped liquid crystal compound and is preferably a rod-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

——Surfactant——

The liquid crystal composition used for forming the cholesteric liquid crystal layer 16 may include a surfactant.

It is preferable that the surfactant is a compound that can function as an alignment controller contributing to the stable or rapid formation of a cholesteric liquid crystalline phase with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

——Chiral Agent (Optically Active Compound)——

The chiral agent has a function of causing a helical structure of a cholesteric liquid crystalline phase to be formed. The chiral agent may be selected depending on the purpose because a helical twisting direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a surface asymmetric compound not having an asymmetric carbon atom can also be used as a chiral agent. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

——Polymerization Initiator——

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

——Crosslinking Agent——

In order to improve the film hardness after curing and to improve durability, the liquid crystal composition may optionally include a crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved.

Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

——Other Additives——

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

In a case where the cholesteric liquid crystal layer 16 is formed, it is preferable that the liquid crystal composition is used as a liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the cholesteric liquid crystal layer 16 is formed, it is preferable that the cholesteric liquid crystal layer 16 is formed by applying the liquid crystal composition to a surface where the cholesteric liquid crystal layer 16 is to be formed, aligning the liquid crystal compound to a state of a cholesteric liquid crystalline phase, and curing the liquid crystal compound.

That is, in a case where the cholesteric liquid crystal layer 16 is formed on the alignment film 14, it is preferable that the cholesteric liquid crystal layer 16 obtained by immobilizing a cholesteric liquid cholesteric liquid crystalline phase is formed by applying the liquid crystal composition to the alignment film 14, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer 16. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 100 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the cholesteric liquid crystal layer 16 is not particularly limited, and The thickness with which a required light reflectivity can be obtained may be appropriately set depending on the use of the optical element 10, the light reflectivity required for the cholesteric liquid crystal layer, the material for forming the cholesteric liquid crystal layer, and the like.

<<Liquid Crystal Alignment Pattern of Cholesteric Liquid Crystal Layer>>

As described above, in the optical element 10 according to the embodiment of the present invention, the cholesteric liquid crystal layer 16 has the liquid crystal alignment pattern in which the direction of the optical axis 30A derived from the liquid crystal compound 30 forming the cholesteric liquid crystalline phase changes while continuously rotating in the in-plane direction of the cholesteric liquid crystal layer 16.

The optical axis 30A derived from the liquid crystal compound 30 is an axis having the highest refractive index in the liquid crystal compound 30, that is, a so-called slow axis. For example, in a case where the liquid crystal compound 30 is a rod-shaped liquid crystal compound, the optical axis 30A is along a rod-shaped major axis direction. In the following description, the optical axis 30A derived from the liquid crystal compound 30 will also be referred to as "the optical axis 30A of the liquid crystal compound 30" or "the optical axis 30A".

Figure 3:
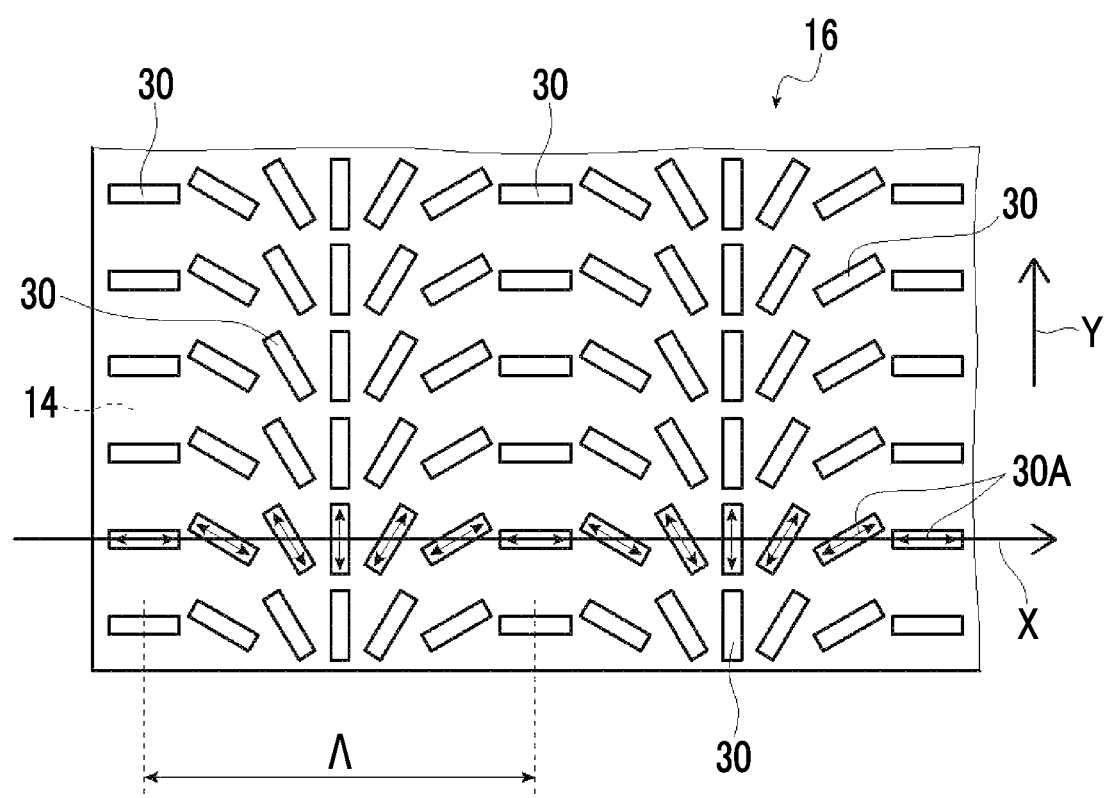
FIG. 3 is a plan view showing the cholesteric liquid crystal layer of the optical element shown in FIG. 1.

FIG. 3 conceptually shows a plan view of the cholesteric liquid crystal layer 16.

The plan view is a view in a case where the optical element 10 is seen from the top in FIG. 1, that is, a view in a case where the optical element 10 is seen from a thickness direction (laminating direction of the respective layers (films)). In other words, the plan view is a view in a case where the cholesteric liquid crystal layer 16 is seen from a direction perpendicular to a main surface. The main surface is the maximum surface of a sheet-shaped material (a film or a plate-shaped material).

Figure 2:
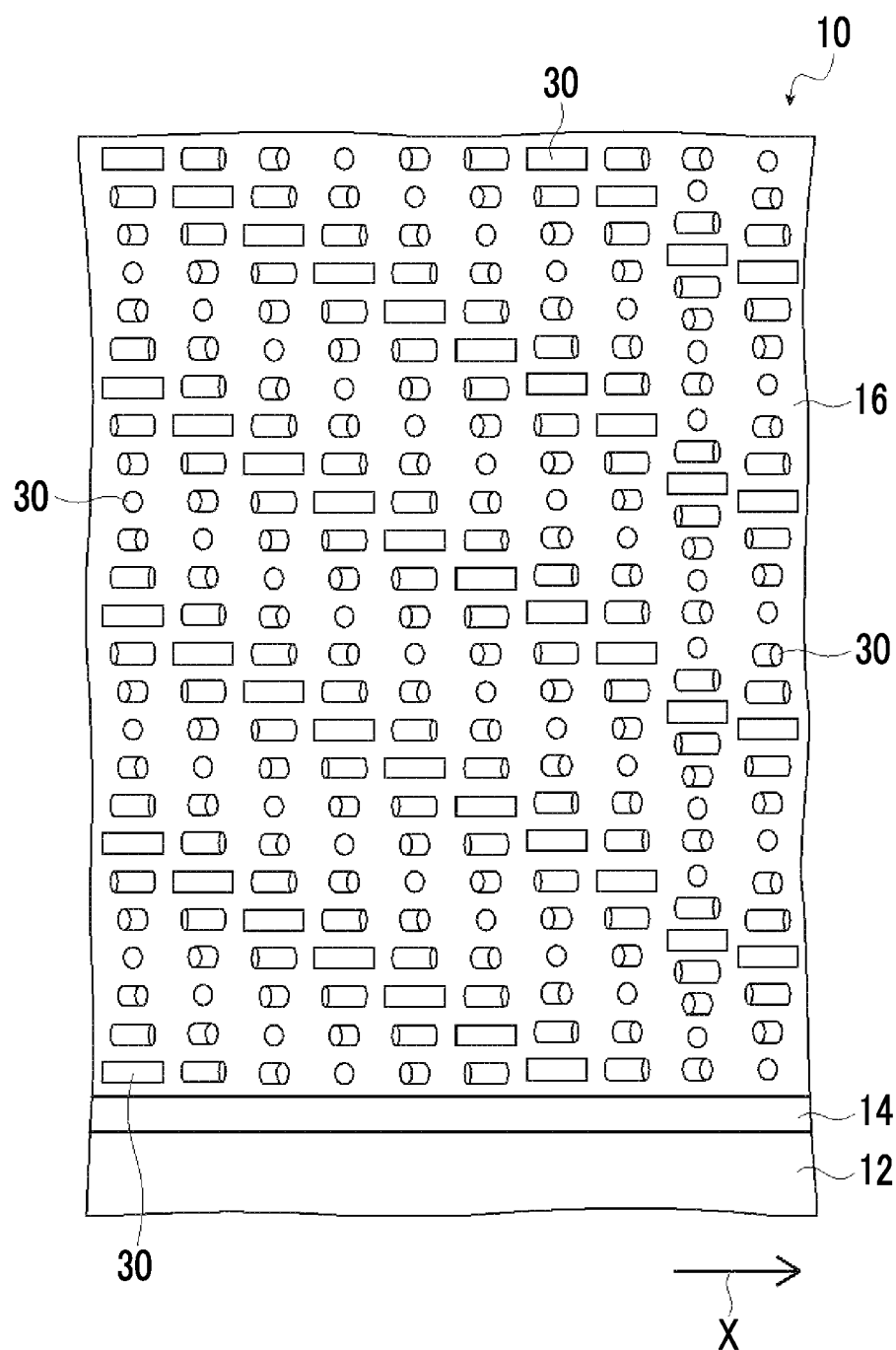
FIG. 2 is a conceptual diagram showing a cholesteric liquid crystal layer of the optical element shown in FIG. 1.

In addition, in FIG. 3, in order to clarify the configuration of the optical element 10 according to the embodiment of the present invention, only the liquid crystal compound 30 on the surface of the alignment film 14 is shown as in FIG. 1. However, in the thickness direction, as shown in FIG. 2, the cholesteric liquid crystal layer 16 has the helical structure in which the liquid crystal compound 30 on the surface of the alignment film 14 is helically turned and rotated as described above.

As shown in FIG. 3, on the surface of the alignment film 14, the liquid crystal compound 30 forming the cholesteric liquid crystal layer 16 is two-dimensionally arranged according to the alignment pattern formed on the alignment film 14 as the lower layer in a predetermined in-plane direction indicated by arrow X and a direction perpendicular to the in-plane direction (arrow X direction).

In the following description, the direction perpendicular to the arrow X direction will be referred to as "Y direction" for convenience of description. That is, in FIGS. 1 and 2 and FIGS. 4, 6, and 7 described below, the Y direction is a direction perpendicular to the paper plane.

In addition, the liquid crystal compound 30 forming the cholesteric liquid crystal layer 16 has the liquid crystal alignment pattern in which the direction of the optical axis 30A changes while continuously rotating in the arrow X direction in a plane of the cholesteric liquid crystal layer 16.

In the example shown in the drawing, the liquid crystal compound 30 has the liquid crystal alignment pattern in which the optical axis 30A of the liquid crystal compound 30 changes while continuously rotating clockwise in the arrow X direction.

Specifically, "the direction of the optical axis 30A of the liquid crystal compound 30 changes while continuously rotating in the arrow X direction (the predetermined in-plane direction)" represents that an angle between the optical axis 30A of the liquid crystal compound 30, which is arranged in the arrow X direction, and the arrow X direction varies depending on positions in the arrow X direction, and the angle between the optical axis 30A and the arrow X direction sequentially changes from θ to θ+180° or θ−180° in the arrow X direction.

A difference between the angles of the optical axes 30A of the liquid crystal compound 30 adjacent to each other in the arrow X direction is preferably 45° or less and more preferably less than 45°.

On the other hand, in the liquid crystal compound 30 forming the cholesteric liquid crystal layer 16, the directions of the optical axes 30A are the same in the Y direction perpendicular to the arrow X direction, that is, the Y direction perpendicular to the in-plane direction in which the optical axis A continuously rotates.

In other words, in the liquid crystal compound 30 forming the cholesteric liquid crystal layer 16, angles between the optical axes 30A of the liquid crystal compound 30 and the arrow X direction are the same in the Y direction.

In the optical element 10 according to the embodiment of the present invention, in the liquid crystal alignment pattern of the liquid crystal compound 30, the length (distance) over which the optical axis 30A of the liquid crystal compound 30 rotates by 180° in the arrow X direction in which the optical axis 30A changes while continuously rotating is the length Λ of the single period in the liquid crystal alignment pattern.

That is, a distance between centers of two liquid crystal compounds 30 in the arrow X direction is the length Λ of the single period, the two liquid crystal compounds having the same angle in the arrow X direction. Specifically, as shown in FIG. 3, a distance of centers of two liquid crystal compounds 30 in which the arrow X direction and the direction of the optical axis 30A in the arrow X direction is the length Λ of the single period.

The cholesteric liquid crystal layer obtained by immobilizing a cholesteric liquid crystalline phase typically reflects incident light (circularly polarized light) by specular reflection.

On the other hand, the cholesteric liquid crystal layer 16 having the liquid crystal alignment pattern in which the optical axis 30A changes while continuously rotating in the arrow X direction in a plane (the predetermined in-plane direction) reflects incident light in a direction having an angle in the arrow X direction with respect to the incidence light. Hereinafter, the description will be made with reference to FIG. 4.

In the following example, a case where the cholesteric liquid crystal layer 16 reflects right circularly polarized light will be described as an example. Even in a case where the cholesteric liquid crystal layer reflects left circularly polarized light, the same action is exhibited except that a direction of an absolute phase, a tilt direction of an equiphase surface, a reflection direction of light, and the like are reversed.

As described above, the cholesteric liquid crystal layer 16 selectively reflects right circularly polarized light $IR_R$ of infrared light. Accordingly, in a case where light is incident into the optical element 10, the cholesteric liquid crystal layer 16 reflects only right circularly polarized light $IR_R$ of infrared light and allows transmission of the other light.

In a case where the right circularly polarized light $IR_R$ of infrared light incident into the cholesteric liquid crystal layer 16 is reflected from the cholesteric liquid crystal layer 16, the absolute phase changes depending on the directions of the optical axes 30A of the respective liquid crystal compounds 30.

Here, in the cholesteric liquid crystal layer 16, the optical axis 30A of the liquid crystal compound 30 changes while rotating clockwise in the arrow X direction (the in-plane direction). Therefore, the amount of change in the absolute phase of the incident right circularly polarized light $IR_R$ of infrared light varies depending on the directions of the optical axes 30A.

Further, the liquid crystal alignment pattern formed in the cholesteric liquid crystal layer 16 is a pattern that is periodic in the arrow X direction. Therefore, as conceptually shown in FIG. 4, an absolute phase Q1 that is periodic in the arrow X direction corresponding to the direction of the optical axis 30A is assigned to the right circularly polarized light $IR_R$ of infrared light incident into the cholesteric liquid crystal layer 16.

In addition, the direction of the optical axis 30A of the liquid crystal compound 30 with respect to the arrow X direction is uniform in the arrangement of the liquid crystal compound 30 in the Y direction perpendicular to arrow X direction.

As a result, in the cholesteric liquid crystal layer 16, an equiphase surface E1 that is tilted opposite to the arrow X direction with respect to an XY plane is formed for the right circularly polarized light $IR_R$ of infrared light.

Therefore, the right circularly polarized light $IR_R$ of infrared light is reflected in the normal direction of the equiphase surface E1, and the reflected right circularly polarized light $IR_R1$ of infrared light is reflected in a direction that is tilted in the arrow X direction with respect to the XY plane. That is, the XY plane is a main surface of the cholesteric liquid crystal layer 16.

Figure 4:
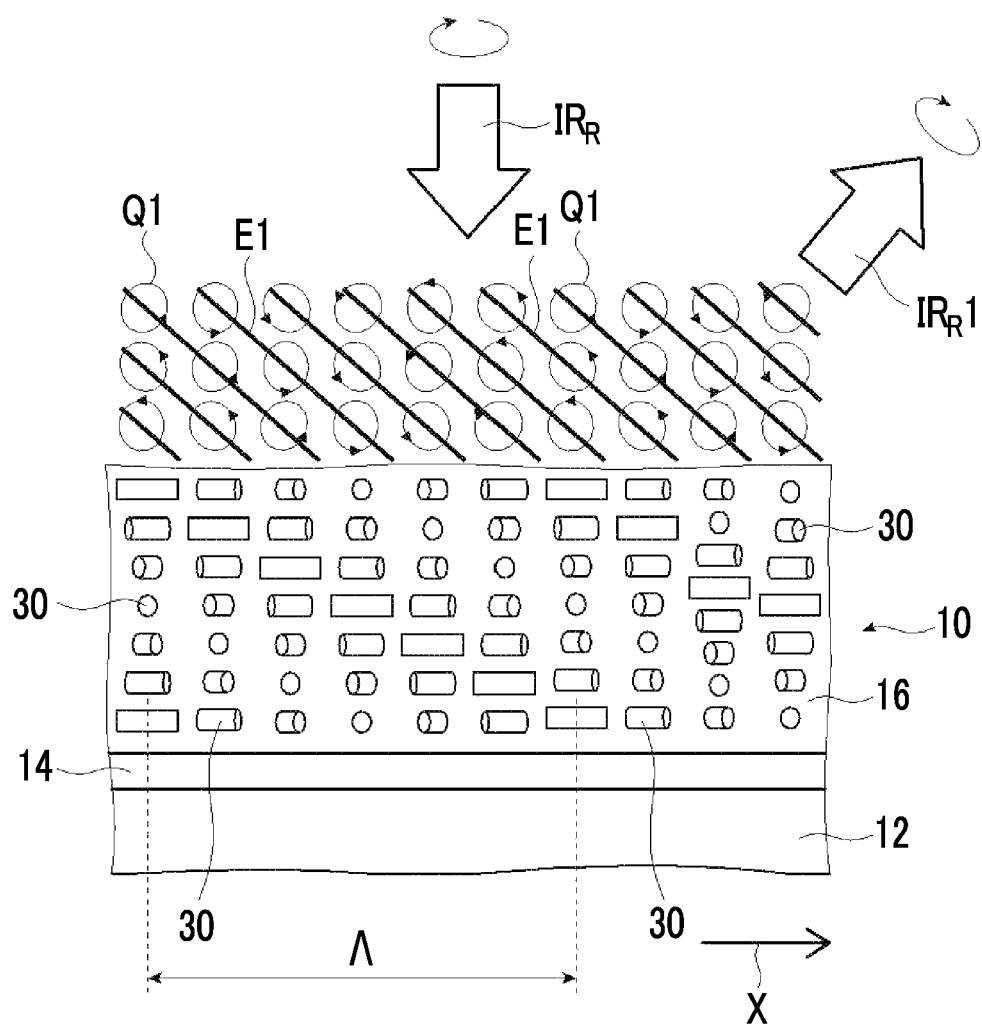
FIG. 4 is a conceptual diagram showing an action of the cholesteric liquid crystal layer of the optical element shown in FIG. 1.
Figure 5:
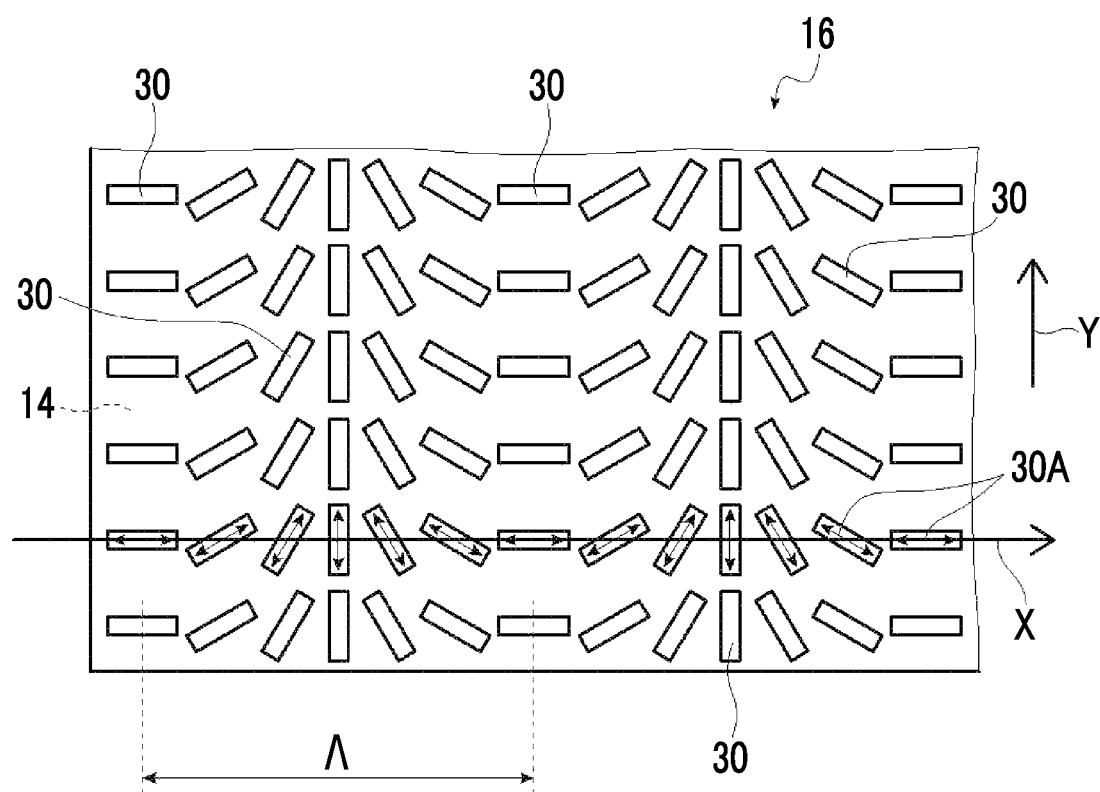
FIG. 5 is a plan view showing another example of the cholesteric liquid crystal layer of the optical element according to the present invention.
Figure 6:
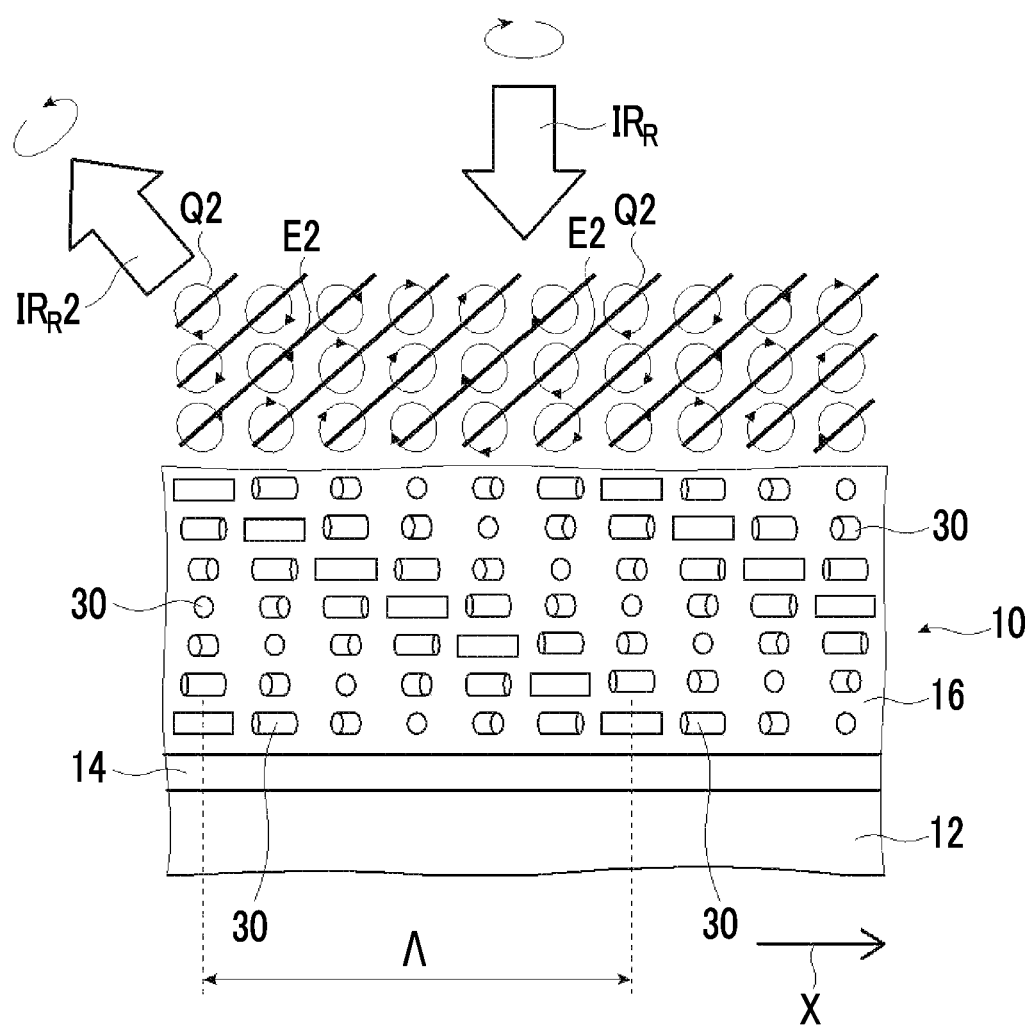
FIG. 6 is a conceptual diagram showing an action of the cholesteric liquid crystal layer of the optical element shown in FIG. 5.

On the other hand, in a case where the rotation of the optical axis 30A of the liquid crystal compound 30 is counterclockwise toward the arrow X direction as in a cholesteric liquid crystal layer 16a conceptually shown in FIGS. 5 and 6 instead of being clockwise as in the cholesteric liquid crystal layer 16 shown in FIGS. 1, 3, and 4, an absolute phase Q2 that is periodic in the X direction corresponding to the direction of the optical axis 30A is opposite to that in a case where the optical axis 30A is clockwise as shown in FIG. 6.

As a result, in a case where the rotation of the optical axis 30A of the liquid crystal compound 30 is counterclockwise, an equiphase surface E2 that is tilted in the arrow X direction with respect to an XY plane is formed, the XY plane being tilted opposite to that in a case where the rotation of the optical axis 30A is clockwise.

Therefore, right circularly polarized light $IR_R$ of infrared light incident into the cholesteric liquid crystal layer 16a in which the rotation of the optical axis 30A of the liquid crystal compound 30 is counterclockwise is reflected in the normal direction of the equiphase surface E2, and the reflected right circularly polarized light $IR_R2$ of infrared light is reflected in a direction that is tilted opposite to the arrow X direction with respect to the XY plane.

Here, a reflection angle of light from the cholesteric liquid crystal layer 16 in which the optical axis 30A of the liquid crystal compound 30 continuously rotates in the arrow X direction varies depending on the length Λ of the single period of the liquid crystal alignment pattern over which the optical axis 30A rotates by 180° in the arrow X direction. Specifically, as the length Λ of the single period in the liquid crystal alignment pattern becomes shorter, the angle of reflected light with respect to incidence light increases.

That is, in the optical element according to the embodiment of the present invention, by adjusting the length Λ of the single period in the liquid crystal alignment pattern of the cholesteric liquid crystal layer in the in-plane direction, for example, a reflection angle of light incident from the normal direction can be made to vary depending on in-plane regions of the cholesteric liquid crystal layer.

FIG. 1 shows an end portion of the optical element 10 opposite to the arrow X direction.

In the optical element 10, for example, the length Λ of the single period gradually decreases on a two-period basis toward the upstream side in the arrow X direction, that is, toward the direction opposite to the arrow X direction. That is, the length Λ of the single period gradually decreases on a two-period basis from the right side toward the left side in the drawing.

Specifically, the length Λ of the single period of the liquid crystal alignment pattern gradually decreases toward the direction (toward the left side in the drawing) opposite to the arrow X direction such that a length Λa of the single period in the two periods on the leftmost side in the drawing is the shortest length, a length Λb of the single period in the two periods on the next right side is the second shortest length, a length Λc of the single period in the two periods on the next right side is the third shortest length, and . . . . In other words, the length Λ of the single period of the liquid crystal alignment pattern gradually increases toward the arrow X direction (toward the right side in the drawing).

As described above, the angle of reflected light from the cholesteric liquid crystal layer 16 with respect to incidence light increases as the length Λ of the single period decreases.

Accordingly, as conceptually shown in FIG. 1, in a case where light is incident from the normal direction, light ($IR_R$) incident into the two periods on the leftmost side having the shortest length Λa of the single period is tilted toward the arrow X direction (the right direction in the drawing) to the highest degree and is reflected at the largest angle with respect to the incidence light ($IR_R1$). In this example, the normal direction is a direction perpendicular to the main surface of the cholesteric liquid crystal layer.

In addition, light ($IR_R$) incident into the two periods on the next right side (the third and fourth periods from the left) having the second shortest length Λb of the single period is tilted toward the arrow X direction to the second highest degree and is reflected at the second largest angle with respect to the incidence light ($IR_R1$).

Further, light ($IR_R$) incident into the two periods on the next right side (the fifth and sixth periods from the left) having the third shortest length Λc of the single period is tilted toward the arrow X direction to the third highest degree and is reflected at the third largest angle with respect to the incidence light ($IR_R1$).

Hereinafter, as a light incidence position moves toward the right side (the downstream side in the arrow X direction), the tilt amount in the arrow X direction, that is, the angle of reflected light with respect to incidence light gradually decreases. Accordingly, in the optical element 10 shown in FIG. 1, incident light ($IR_R$) can be reflected to be gathered in the arrow X direction.

In addition, as described above, in the optical element according to the embodiment of the present invention, a light reflection direction can be reversed by reversing the rotation direction of the optical axis 30A of the liquid crystal compound 30 forming the cholesteric liquid crystal layer. By using this effect, an optical element that can gather light in a linear shape can also be prepared.

Figure 7:
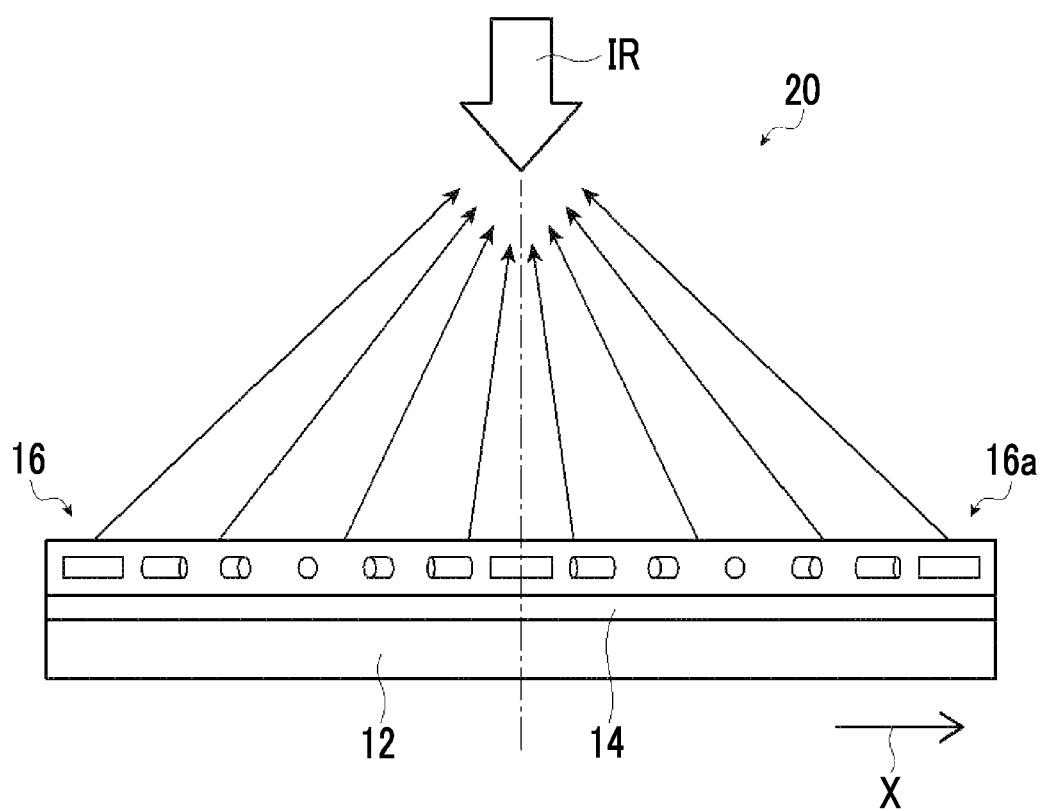
FIG. 7 is a diagram conceptually showing still another example of the optical element according to the present invention.

For example, as in an optical element 20 shown in FIG. 7, a region positioned on the upstream side (left side in the drawing) in the arrow X direction from the center (chain line) in the arrow X direction is the cholesteric liquid crystal layer 16 shown in FIGS. 3 and 4 in which the rotation direction of the optical axis 30A of the liquid crystal compound 30 is clockwise toward the arrow X direction. On the other hand, a region positioned on the downstream side (right side in the drawing) in the arrow X direction from the center (chain line) in the arrow X direction is the cholesteric liquid crystal layer 16a shown in FIGS. 5 and 6 in which the rotation direction of the optical axis 30A of the liquid crystal compound 30 is counterclockwise toward the arrow X direction.

Further, FIG. 7 shows the single periods for simplification of the drawing. However, in the cholesteric liquid crystal layer 16 and the cholesteric liquid crystal layer 16a of the optical element 20, the length Λ of the single period of the liquid crystal alignment pattern gradually decreases from the center to the outside of the optical element 20. In other words, in the cholesteric liquid crystal layer 16, the length Λ of the single period of the liquid crystal alignment pattern gradually decreases toward the downstream side in the arrow X direction. In the cholesteric liquid crystal layer 16a, the length Λ of the single period of the liquid crystal alignment pattern gradually decreases toward the upstream side in the arrow X direction.

As described above, the cholesteric liquid crystal layer 16 shown in FIGS. 3 and 4 in which the rotation direction of the optical axis 30A of the liquid crystal compound 30 is clockwise reflects incidence light to be tilted in the X direction. On the other hand, the cholesteric liquid crystal layer 16a shown in FIGS. 5 and 6 in which the rotation direction of the optical axis 30A of the liquid crystal compound 30 is counterclockwise reflects incidence light to be tilted in a direction opposite to the X direction.

Further, as the length Λ of the single period in the liquid crystal alignment pattern becomes shorter, the angle of reflected light with respect to incidence light increases.

Therefore, the optical element 20 can reflect light (for example, infrared light (IR)) incident from the normal direction to be gathered in a linear shape toward the center in the arrow X direction.

That is, in the optical element according to the embodiment of the present invention in which the cholesteric liquid crystal layer has regions having different lengths Λ of the single periods in a plane, by appropriately setting the length Λ of the single period of the liquid crystal alignment pattern in each of the regions of the cholesteric liquid crystal layer in the plane of the cholesteric liquid crystal layer, incident light can be reflected to be gathered in a desired direction. Further, in the optical element according to the embodiment of the present invention, unlike the concave mirror used in JP1997-127235A (JP-H9-127235A), it is not necessary that a light reflecting surface is curved. Therefore, the optical element can obtain a sufficient light gathering performance.

Further, the cholesteric liquid crystal layer has wavelength selective reflection properties, and thus can allow transmission of unnecessary light and can reflect only light having a desired wavelength range. Therefore, only light having a desired wavelength range can be gathered without requiring a band pass filter, a high pass filter, or the like.

Therefore, by using the optical element according to the embodiment of the present invention, the size of an optical device that is required to reflect light having a desired wavelength range in a predetermined direction to be gathered can be reduced. For example, by using the optical element according to the embodiment of the present invention as a sensor or the like that detects an object and measures the distance to the object using infrared light, the sensor can be reduced in size and can be suitably mounted even in a narrow installation place such as an automobile, a robot, or a drone.

In the example shown in FIG. 1, in the cholesteric liquid crystal layer 16, the length Λ of the single period gradually decreases toward the outer direction of the cholesteric liquid crystal layer 16 on a two-period basis of the liquid crystal alignment pattern. However, the present invention is not limited to this example.

That is, in the optical element according to the embodiment of the present invention, the length Λ of the single period may gradually decrease or increase on a predetermined period basis, for example, a one-period basis, a 10-period basis, a 20-period basis, or a 100-period basis. The number of periods on which the length Λ of the single period changes may be appropriately set depending on the size of the optical element, required properties for the optical element, the use of the optical element, and the like.

In the optical element 10 according to the embodiment of the present invention, the length Λ of the single period in the liquid crystal alignment pattern of the cholesteric liquid crystal layer 16 is also not particularly limited and may be appropriately set depending on the size of the optical element, required properties for the optical element, the use of the optical element, and the like.

The optical element 10 shown in FIG. 6 includes only one cholesteric liquid crystal layer 16, but the present invention is not limited thereto. The optical element may include two or two or more cholesteric liquid crystal layers having the same (substantially the same) selective reflection center wavelength and different directions of circularly polarized light to be reflected, that is, different senses of a helical structure.

For example, the optical element 10 shown in the drawing may further include a second cholesteric liquid crystal layer that has a selective reflection center wavelength in an infrared wavelength range and reflects left circularly polarized light of infrared light.

This way, by providing the cholesteric liquid crystal layers having the same selective reflection center wavelength and different directions of circularly polarized light to be reflected, a reflectivity of light in a desired wavelength range, for example, a reflectivity of infrared light can be improved.

Here, in the cholesteric liquid crystal layers having the same selective reflection center wavelength and different directions of circularly polarized light to be reflected, it is preferable that the rotation directions of the optical axes 30A of the liquid crystal compound 30 in the in-plane direction in which the optical axis 30A of the liquid crystal alignment pattern rotates are different from each other.

For example, in a case where the rotation direction of the optical axis 30A of the liquid crystal compound 30 in the cholesteric liquid crystal layer 16 that reflects right circularly polarized light of infrared light is clockwise in the arrow X direction as shown in FIG. 3, it is preferable that the rotation direction of the optical axis 30A of the liquid crystal compound 30 in the second cholesteric liquid crystal layer that reflects left circularly polarized light of infrared light is counterclockwise in the arrow X direction as shown in FIG. 5.

In the cholesteric liquid crystal layers in which the optical axis 30A of the liquid crystal compound 30 continuously rotates in the arrow X direction (the in-plane direction), as described above, in a case where the turning directions of circularly polarized light are different from each other and the rotation directions of the optical axes 30A are the same, a reflection direction of circularly polarized light in the cholesteric liquid crystal layer that reflects right circularly polarized light is opposite to that in the cholesteric liquid crystal layer that reflects left circularly polarized light.

In addition, as described above, even in a case where the rotation directions of the optical axes 30A of the liquid crystal compound 30 in the liquid crystal alignment pattern are opposite to each other, the reflection directions of circularly polarized light are opposite to each other.

Accordingly, in the cholesteric liquid crystal layers having the same selective reflection center wavelength and different turning directions of circularly polarized light to be reflected, by setting the rotation directions of the optical axes 30A of the liquid crystal compound 30 in the liquid crystal alignment pattern to be opposite to each other, a reflection direction of circularly polarized light in the cholesteric liquid crystal layer that reflects right circularly polarized light can be made to be the same as that in the cholesteric liquid crystal layer that reflects left circularly polarized light.

In addition, this way, in a case where the optical element according to the embodiment of the present invention includes the cholesteric liquid crystal layers having the same selective reflection center wavelength and different directions of circularly polarized light to be reflected, it is preferable that the two cholesteric liquid crystal layers have the same liquid crystal alignment pattern such as the length Λ of the single period except that the rotation directions of the optical axes 30A of the liquid crystal compound 30 in the in-plane direction in which the optical axis 30A of the liquid crystal alignment pattern rotates are opposite to each other.

In the optical elements shown in FIGS. 1 to 6, the optical axis 30A of the liquid crystal compound 30 in the liquid crystal alignment pattern of the cholesteric liquid crystal layer continuously rotates only in the arrow X direction.

However, the present invention is not limited thereto, and various configurations can be used as long as the optical axis 30A of the liquid crystal compound 30 in the cholesteric liquid crystal layer continuously rotates in the in-plane direction and the liquid crystal alignment pattern has regions having different lengths Λ of the single periods over which the optical axis rotates by 180°.

Figure 9:
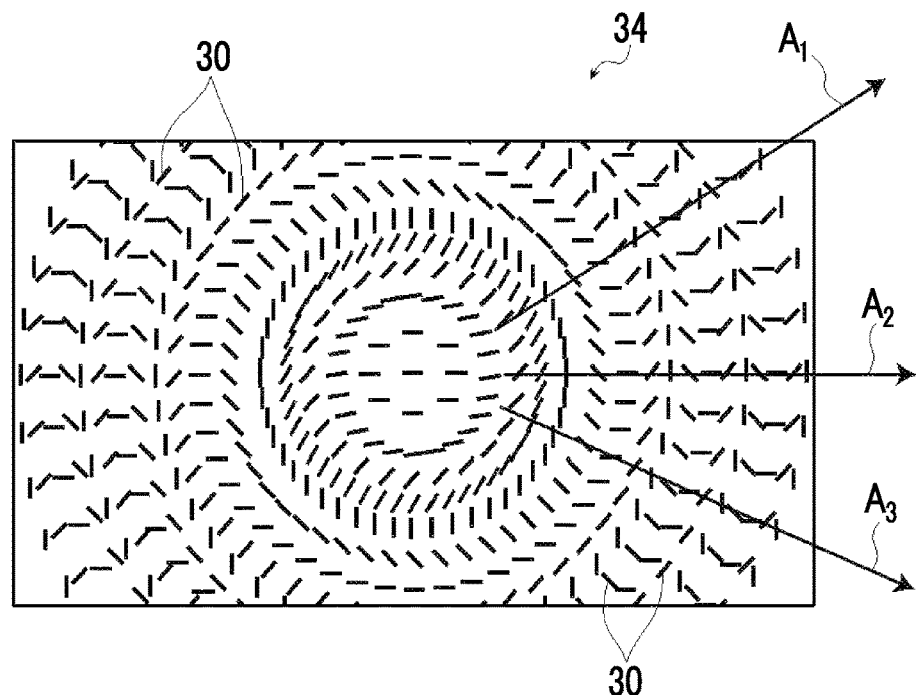
FIG. 9 is a plan view showing still another example of the cholesteric liquid crystal layer of the optical element according to the present invention.

For example, a cholesteric liquid crystal layer 34 conceptually shown in a plan view of FIG. 9 can be used, in which a liquid crystal alignment pattern is a concentric circular pattern having a concentric circular shape where the in-plane direction in which the direction of the optical axis of the liquid crystal compound 30 changes while continuously rotating moves from an inside toward an outside.

Alternatively, a liquid crystal alignment pattern can also be used where the in-plane direction in which the direction of the optical axis of the liquid crystal compound 30 changes while continuously rotating is provided in a radial shape from the center of the cholesteric liquid crystal layer 34 instead of a concentric circular shape as in the liquid crystal alignment pattern shown in FIG. 9.

FIG. 9 shows only the liquid crystal compound 30 of the surface of the alignment film as in FIG. 3. However, as shown in FIG. 2, the cholesteric liquid crystal layer 34 has the helical structure in which the liquid crystal compound 30 on the surface of the alignment film is helically turned and rotated as described above.

Further, FIG. 9 shows only one cholesteric liquid crystal layer 34. Even in this configuration, the optical element may include a second cholesteric liquid crystal layer having the same selective reflection center wavelength and different turning directions of circularly polarized light, preferably, different rotation directions of the optical axis of the liquid crystal compound 30.

In the cholesteric liquid crystal layer 34 shown in FIG. 9, the optical axis (not shown) of the liquid crystal compound 30 is a longitudinal direction of the liquid crystal compound 30.

In the cholesteric liquid crystal layer 34, the direction of the optical axis of the liquid crystal compound 30 changes while continuously rotating in a direction in which a large number of optical axes move to the outside from the center of the cholesteric liquid crystal layer 34, for example, a direction indicated by an arrow $A_1$, a direction indicated by an arrow $A_2$, a direction indicated by an arrow $A_3$, or . . . .

In addition, the rotation directions of the optical axes indicated by the arrows $A_1$, $A_2$, and $A_3$ are reversed with respect to the center of the cholesteric liquid crystal layer 34. For example, regarding the arrow $A_2$ direction, the rotation direction of the optical axis of the liquid crystal compound 30 is clockwise on the upstream side of the arrow $A_2$ direction, is reversed with respect to the center of the cholesteric liquid crystal layer 34, and is counterclockwise on the downstream side of the center.

In circularly polarized light incident into the cholesteric liquid crystal layer 34 having the above-described liquid crystal alignment pattern, likewise, the absolute phase changes depending on individual local regions having different optical axes of the liquid crystal compound 30. At this time, the amount of change in absolute phase varies depending on the directions of the optical axes of the liquid crystal compound 30 into which circularly polarized light is incident.

This way, in the cholesteric liquid crystal layer 34 having the concentric circular liquid crystal alignment pattern, that is, the liquid crystal alignment pattern in which the optical axis changes while continuously rotating in a radial shape, incidence light can be reflected as diverging light or converging light depending on the rotation direction of the optical axis of the liquid crystal compound 30 and the direction of circularly polarized light to be reflected.

That is, by setting the liquid crystal alignment pattern of the cholesteric liquid crystal layer in a concentric circular shape, the optical element according to the embodiment of the present invention exhibits, for example, a function as a concave mirror or a convex mirror.

Here, in a case where the liquid crystal alignment pattern of the cholesteric liquid crystal layer is concentric circular such that the optical element functions as a concave mirror, it is preferable that the length Λ of the single period over which the optical axis rotates by 180° in the liquid crystal alignment pattern gradually decreases toward the outer direction from the center of the cholesteric liquid crystal layer 34. For example, regarding the arrow A2 direction, it is preferable that the length Λ of the single period gradually decreases toward a direction (upstream side) opposite to the arrow $A_2$ direction on the upstream side of the center in the arrow $A_2$ direction and gradually decreases toward the arrow $A_2$ direction on the downstream side of the center in the arrow $A_2$ direction.

As described above, the reflection angle of light with respect to an incidence direction increases as the length Λ of the single period in the liquid crystal alignment pattern decreases. Accordingly, the length Λ of the single period in the liquid crystal alignment pattern gradually decreases toward the outer direction from the center of the cholesteric liquid crystal layer 34. As a result, the light gathering power of the cholesteric liquid crystal layer can be improved, and the performance as a concave mirror can be improved.

In the present invention, depending on the uses of the optical element such as a convex mirror, conversely, the length Λ of the single period in the concentric circular liquid crystal alignment pattern may gradually increase toward the outer direction from the center of the cholesteric liquid crystal layer 34.

Further, depending on the uses of the optical element such as a case where it is desired to provide a light amount distribution in reflected light, a configuration in which regions having partially different lengths Λ of the single periods in the in-plane direction in which the optical axis continuously rotates are provided can also be used instead of the configuration in which the length Λ of the single period gradually changes in the in-plane direction in which the optical axis continuously rotates.

Figure 10:
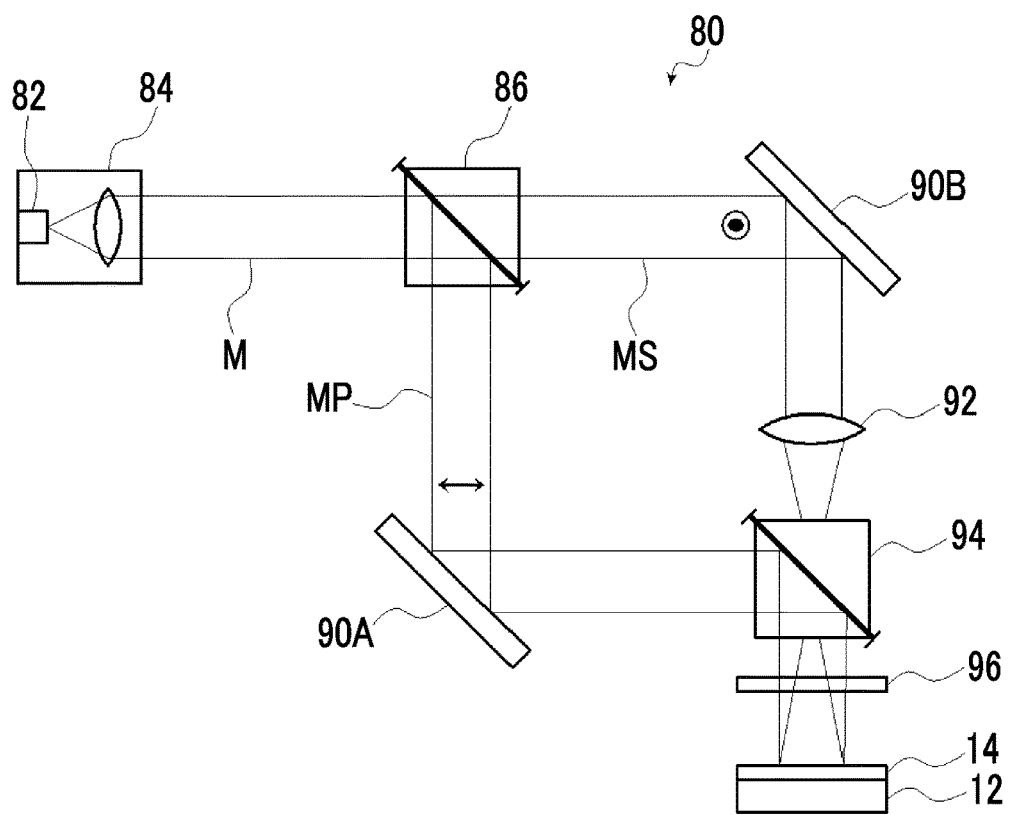
FIG. 10 is a conceptual diagram showing another example of the exposure device that exposes the alignment film for forming the cholesteric liquid crystal layer shown in FIG. 9.

FIG. 10 conceptually shows an example of an exposure device that forms the concentric circular alignment pattern in the alignment film 14.

An exposure device 80 includes: a light source 84 that includes a semiconductor laser 82; a polarization beam splitter 86 that divides the laser light M emitted from the semiconductor laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is gathered by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 14 on the support 12.

Due to interference between the right circularly polarized light and the left circularly polarized light, the polarization state of light with which the alignment film 14 is irradiated periodically changes according to interference fringes. The intersection angle between the right circularly polarized light and the left circularly polarized light changes from the inside to the outside of the concentric circle. Therefore, an exposure pattern in which the alignment state periodically changes from the inside to the outside can be obtained. As a result, in the alignment film 14, a concentric circular alignment pattern in which the alignment state periodically changes can be obtained.

In the exposure device 80, the length Λ of the single period in the liquid crystal alignment pattern in which the optical axis of the liquid crystal compound 30 continuously rotates by 180° can be controlled by changing the refractive power of the lens 92 (the F number of the lens 92), the focal length of the lens 92, the distance between the lens 92 and the alignment film 14, and the like.

In addition, by adjusting the refractive power of the lens 92, the length Λ of the single period in the liquid crystal alignment pattern in the in-plane direction in which the optical axis continuously rotates can be changed. Specifically, In addition, the length Λ of the single period in the liquid crystal alignment pattern in the in-plane direction in which the optical axis continuously rotates can be changed depending on a light spread angle at which light is spread by the lens 92 due to interference with parallel light. More specifically, in a case where the refractive power of the lens 92 is weak, light is approximated to parallel light. Therefore, the length Λ of the single period in the liquid crystal alignment pattern gradually decreases from the inside toward the outside, and the F number increases. Conversely, in a case where the refractive power of the lens 92 becomes stronger, the length Λ of the single period in the liquid crystal alignment pattern rapidly decreases from the inside toward the outside, and the F number decreases.

In the optical element according to the embodiment of the present invention, the length Λ of the single period over which the optical axis rotates by 180° is not limited to the configuration in which the length Λ of the single period gradually changes, and various configurations can be used.

For example, depending on the uses of the optical element such as a case where it is desired to provide a light amount distribution in reflected light, a configuration in which regions having partially different lengths Λ of the single periods in the arrow X direction are provided can also be used instead of the configuration in which the length Λ of the single period gradually changes in the arrow X direction.

The optical element according to the embodiment of the present invention can be used for various uses where light is reflected to be gathered, for example, an optical path changing member, a light gathering element, a light diffusing element to a predetermined direction, a diffraction element, or the like in a sensor or an optical device.

FIG. 11 conceptually shows an example of a sensor according to the embodiment of the present invention including the optical element according to the embodiment of the present invention.

A sensor 40 shown in FIG. 11 includes: a plane light source 42 that emits infrared light; an optical element 46 according to the embodiment of the present invention; and a light-receiving element 48 (infrared camera) that measures infrared light.

In the sensor 40 shown in FIG. 11, infrared light emitted from the plane light source 42 is incident into an object O (measurement target), and the infrared light reflected from the object O is reflected from the optical element 46 to be incident into the light-receiving element 48.

The optical element 46 includes the cholesteric liquid crystal layer having a concentric circular liquid crystal alignment pattern shown in FIG. 9, gathers right circularly polarized light of incident infrared light to be incident into the light-receiving element 48, and allow transmission of the other light.

As described above, the optical element 46 according to the embodiment of the present invention can reflect only light in a desired wavelength range without using a band pass filter or a high pass filter. Further, even the thin optical element not having a curved surface, for example, a concave mirror or a convex lens can gather light in a desired direction.

Therefore, a sensor including the optical element 46 according to the embodiment of the present invention can be easily reduced in size and can be suitably mounted even in a narrow installation place such as an automobile, a robot, or a drone.

It is preferable that the sensor 40 according to the embodiment of the present invention includes an absorber that absorbs at least a part of light transmitted through the optical element 46 according to the embodiment of the present invention, preferably, absorbs all of the light other than light in a reflection wavelength range of the optical element 46. By providing the above-described absorber, noise generated when light transmitted through the optical element 46 is reflected from the inside or the like of the sensor 40 by diffused reflection to be incident into the light-receiving element 48 can be prevented.

The absorber is not particularly limited, and various well-known light absorber can be used as long as they can absorb light transmitted through the optical element 46, for example, a black plate or various light absorbing filters.

In addition, the absorber may be provided to face a surface of the light-receiving element 48 opposite to a light incident surface or may be bonded to the light incident surface of the light-receiving element 48 using a pressure sensitive adhesive or an adhesive.

Further, in the sensor 40 according to the embodiment of the present invention, the plane light source 42 may emit a continuous wave but preferably emits a pulse wave.

The plane light source 42 emits a pulse wave such that whether or not infrared light received by the light-receiving element 35 is infrared light emitted from the plane light source 42 or infrared light of external light that is unnecessarily incident into the sensor 40. As a result, the detection accuracy of the object O, the distance measurement accuracy, and the like can be improved.

Hereinabove, the optical element and the sensor according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of Optical Element>
(Support and Saponification Treatment of Support)
As the support, a commercially available triacetyl cellulose film (manufactured by Fuji Film Co., Ltd., Z-TAC) was used.

The support was caused to pass through an induction heating roll at a temperature of 60° C. such that the support surface temperature was increased to 40° C.

Next, an alkali solution shown below was applied to a single surface of the support using a bar coater in an application amount of 14 mL (liter)/m$^2$, the support was heated to 110° C., and the support was transported for 10 seconds under a steam infrared electric heater (manufactured by Noritake Co., Ltd.).

Next, 3 mL/m$^2$ of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

Alkali Solution

| | | |
|---|---|---|
| Potassium hydroxide | ... | 4.70 parts by mass |
| Water | ... | 15.80 parts by mass |
| Isopropanol | ... | 63.70 parts by mass |
| Surfactant | | |
| SF-1: $C_{14}H_{29}O(CH_2CH_2O)_2OH$ | ... | 1.00 part by mass |
| Propylene glycol | ... | 14.80 parts by mass |

(Formation of Undercoat Layer)
The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

Undercoat Layer-Forming Coating Solution

| | |
|---|---|
| The following modified polyvinyl alcohol | 2.40 parts by mass |
| Isopropyl alcohol | 1.60 parts by mass |
| Methanol | 36.00 parts by mass |
| Water | 60.00 parts by mass |

Modified Polyvinyl Alcohol

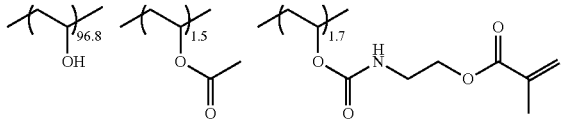

(Formation of Alignment Film)
The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

Alignment Film-Forming Coating Solution

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

-Material for Photo-Alignment-

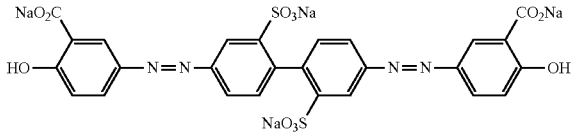

(Exposure of Alignment Film)
The alignment film was exposed using the exposure device shown in FIG. 10 to form an alignment film having an alignment pattern.

In the exposure device, a laser that emits laser light having a wavelength (405 nm) was used as the semiconductor laser. The exposure dose of the interference light was 100 mJ/cm$^2$. In addition, the length of the single period in the alignment pattern was controlled by adjusting the focal length of the lens.

During the exposure, parallel light and light spread by the lens are caused to interfere with each other such that the length of the single period in the alignment pattern gradually decreased toward the outer direction.

(Formation of Cholesteric Liquid Crystal Layer)

As the liquid crystal composition forming the cholesteric liquid crystal layer, the following liquid crystal composition was prepared. This liquid crystal composition is a liquid crystal composition forming a cholesteric liquid crystal layer (cholesteric liquid crystalline phase) that has a selective reflection center wavelength of 940 nm and reflects right circularly polarized light.

Liquid Crystal Composition liquid crystal composition, and irradiating the liquid crystal composition with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the following liquid crystal composition was applied to the alignment film to form a coating film, the coating film was heated using a hot plate at 70° C., the coating film was cooled to 25° C., and the coating film was irradiated with ultraviolet light having a wavelength of 365 nm at an irradiation dose of 100 mJ/cm$^2$ using a high-pressure mercury lamp in a nitrogen atmosphere. As a result, the alignment of the liquid crystal compound was immobilized. At this time, the thickness of the first liquid crystal layer was 0.2 μm.

| | |
|---|---:|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 3.11 parts by mass |
| Leveling agent T-1 | 0.08 parts by mass |
| Methyl ethyl ketone | 268.20 parts by mass |

Rod-shaped liquid crystal compound L-1

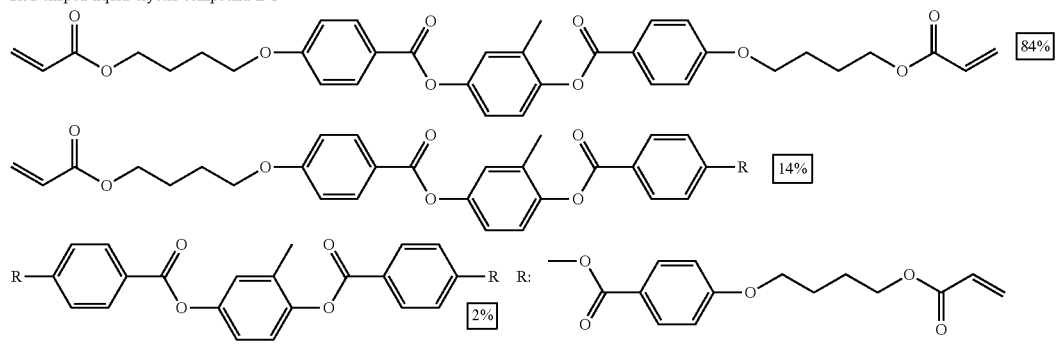

Chiral agent Ch-1

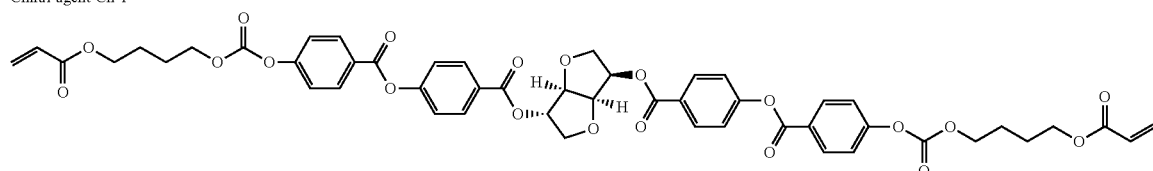

Leveling Agent T-1

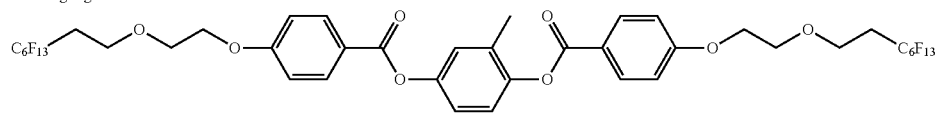

The cholesteric liquid crystal layer was formed by applying multiple layers of the liquid crystal composition to the alignment film. The application of the multiple layers refers to repetition of the following processes including: forming a first liquid crystal immobilized layer by applying the first layer-forming liquid crystal composition to the alignment film, heating the liquid crystal composition, cooling the liquid crystal composition, and irradiating the liquid crystal composition with ultraviolet light for curing; and forming a second or subsequent liquid crystal immobilized layer by applying the second or subsequent layer-forming liquid crystal composition to the formed liquid crystal immobilized layer, heating the liquid crystal composition, cooling the Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, a cholesteric liquid crystal layer was obtained, and the optical element according to the embodiment of the present invention was prepared.

It was verified using a polarizing microscope that the cholesteric liquid crystal layer had a periodically aligned surface having a concentric circular shape as shown in FIG.

9. In addition, the rotation direction of the optical axis was reversed with respect to the center of the optical element in the in-plane direction in which the optical axis derived from the liquid crystal compound continuously changed.

In the liquid crystal alignment pattern of the R reflection cholesteric liquid crystal layer, the length of the single period over which the optical axis derived from the liquid crystal compound rotated by 180° was 122 µm at a position at a distance of 0.5 mm from the center, was 61 µm at a position at a distance of 1 mm from the center, was 12 µm at a position at a distance of 5 mm from the center, was 6 µm at a position at a distance of 10 mm from the center, and was 5 µm at a position (the most distant end portion) at a distance of 12.25 mm from the center.

A light emitting diode (LED) plane light source emitting light having a center wavelength of 940 nm and a LED plane light source emitting light having a center wavelength of 650 nm were prepared.

Light was emitted from each of the plane light sources to a white plate, the light reflected from the white plate was incident into the prepared optical element, the light reflected from the optical element was measured by a light-receiving element (ARTCAM-130MI-BW-WOM, manufactured by ARTRAY Co., Ltd.).

The distance between the optical element and the light-receiving element was 100 mm. In addition, an absorber (IR-76, manufactured by Fuji Film Co., Ltd.) was bonded using a pressure sensitive adhesive to a surface of the optical element opposite to a surface into which the light reflected from the white plate was incident.

The output (8-bit image data) from the light-receiving element was 150 in a case where light is emitted from the LED plane light source having a center wavelength of 940 nm and was 10 in a case where light is emitted from the LED plane light source having a center wavelength of 650 nm, and a ratio (960 nm/650 nm) therebetween was 15.

Example 2

The photo-alignment film described in Example 1 was formed on glass (Eagle Glass, manufactured by Corning Inc.) under the same conditions as those in Example 1.

Next, a liquid crystal composition was prepared using the same method as that of Example 1, except that the kind and the addition amount of the chiral agent of Example 1 in the liquid crystal composition forming the cholesteric liquid crystal layer were changed. This liquid crystal composition is a liquid crystal composition forming a cholesteric liquid crystal layer (cholesteric liquid crystalline phase) that has a selective reflection center wavelength of 940 nm and reflects left circularly polarized light.

Liquid Crystal Composition

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-2 | 4.61 parts by mass |
| Leveling agent T-1 | 0.08 parts by mass |
| Methyl ethyl ketone | 268.20 parts by mass |

Chiral agent Ch-2

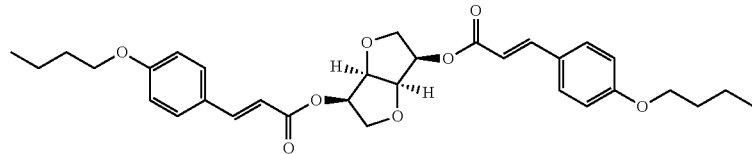 [SMILES: CCCCOc1ccc(/C=C/C(=O)O[C@@H]2CO[C@H]3[C@@H]2OC[C@H]3OC(=O)/C=C/c2ccc(OCCCC)cc2)cc1]

Using the same method as that of Example 1, a cholesteric liquid crystal layer was formed by applying multiple layers of the above-described liquid crystal composition to the photo-alignment film formed on the glass.

Next, the cholesteric liquid crystal layer according to Example 2 was bonded to the cholesteric liquid crystal layer formed in Example 1 through a pressure sensitive adhesive (manufactured by Soken Chemical&Engineering Co., Ltd., SK pressure sensitive adhesive) such that air interface sides of the cholesteric liquid crystal layers faced each other. Further, the cholesteric liquid crystal layer according to Example 2 was peeled off from the glass.

Using the same method as that of Example 1, the output from the light-receiving element was evaluated. As a result, the output from the light-receiving element was 250 in a case where light is emitted from the LED plane light source having a center wavelength of 940 nm and was 13 in a case where light is emitted from the LED plane light source having a center wavelength of 650 nm, and a ratio (960 nm/650 nm) therebetween was 19.

Comparative Example 1

By using a typical optical lens (CANON LENS TV-16 mm 25 mm 1:1.4, manufactured by Canon Inc.) instead of the optical element according to the embodiment of the present invention, light gathered by the optical lens was measured by the light-receiving element. The distance between the optical lens and the light-receiving element was the same as that of Example.

The output from the light-receiving element was 150 in a case where light is emitted from the LED plane light source having a center wavelength of 940 nm and was 150 in a case where light is emitted from the LED plane light source having a center wavelength of 650 nm, and a ratio (960 nm/650 nm) therebetween was 1.

Table 1 below collectively shows the results.

TABLE 1

|  | Output (Image Data) | | 940 nm/ |
|---|---|---|---|
|  | 940 nm | 650 nm | 650 nm |
| Example 1 | 150 | 10 | 15 |
| Example 2 | 250 | 13 | 19 |
| Comparative Example 1 | 150 | 150 | 1 |

As shown in the above-described table, the optical element according to the embodiment of the present invention can gather light on the same level as that of a general optical lens, and can reflect light in a specific wavelength range (in the example, infrared light) in a predetermined direction. In particular, by laminating two cholesteric liquid crystal layers having different directions of circularly polarized light to be reflected (different senses of a helical structure), light in a specific wavelength range can be more suitably reflected in a predetermined direction.

That is, by using a sensor or the like in which the optical element according to the embodiment of the present invention is used for infrared light, measurement light reflected from an object can be suitably made to be incident into a light-receiving element, unnecessary light components other than the measurement light can be prevented from being incident into the light-receiving element, and high-accuracy measurement can be performed with a high S/N ratio.

As can be seen from the above results, the effects of the present invention are obvious.

The present invention is suitably applicable to various uses where light in a specific wavelength range is reflected in a predetermined direction and gathered in an optical device, for example, a light gathering member in a sensor or the like for detecting a forward object in an automobile, a robot, a drone, or the like and measures the distance to the object.

EXPLANATION OF REFERENCES 10, 20, 46: optical element
12: support
14: alignment film
16: cholesteric liquid crystal layer
30: liquid crystal compound
30A: optical axis
34: cholesteric liquid crystal layer
40: sensor
42: plane light source
48: light-receiving element
60, 80: exposure device
62, 82: semiconductor laser
64, 84: light source
68: beam splitter
70A, 70B, 90a, 90B: mirror
72A, 72B, 96: λ/4 plate
86, 94: polarization beam splitter
92: lens
$IR_R$, $IR_R1$, $IR_R2$: right circularly polarized light of infrared light
M: laser light
MA, MB: beam
MP: P polarized light
MS: S polarized light
$P_O$: linearly polarized light
$P_R$: right circularly polarized light
$P_L$: left circularly polarized light
Q1, Q2: absolute phase
E1, E2: equiphase surface
O: object

What is claimed is:

1. An optical element comprising:
   a cholesteric liquid crystal layer that is obtained by immobilizing a cholesteric liquid crystalline phase,
   wherein the cholesteric liquid crystal layer has a liquid crystal alignment pattern in which a direction of an optical axis derived from a liquid crystal compound changes while continuously rotating in at least one in-plane direction,
   in a case where, in the liquid crystal alignment pattern of the cholesteric liquid crystal layer, a length over which the direction of the optical axis derived from the liquid crystal compound rotates by 180° in the in-plane direction in which the direction of the optical axis derived from the liquid crystal compound changes while continuously rotating is set as a single period, the cholesteric liquid crystal layer has in-plane regions having different lengths of the single periods in the liquid crystal alignment pattern,
   wherein the optical element comprises two cholesteric liquid crystal layers each of which is the cholesteric liquid crystal layer, the two cholesteric liquid crystal layers having the same selective reflection center wavelength and different turning directions of circularly polarized light to be reflected, and the two cholesteric liquid crystal layers being laminated, and
   wherein in the two cholesteric liquid crystal layers, rotation directions in which the direction of the optical axis derived from the liquid crystal compound is continuous in the liquid crystal alignment pattern are different from each other.

2. The optical element according to claim 1,
   wherein in at least one of an upstream direction or an downstream direction in the in-plane direction in which the direction of the optical axis derived from the liquid crystal compound changes while continuously rotating, the length of the single period in the liquid crystal alignment pattern of the cholesteric liquid crystal layer gradually decreases.

3. The optical element according to claim 2,
   wherein in a direction toward an outside of the cholesteric liquid crystal layer, the length of the single period in the liquid crystal alignment pattern of the cholesteric liquid crystal layer gradually decreases.

4. The optical element according to claim 1,
   wherein in the in-plane direction in which the direction of the optical axis derived from the liquid crystal compound changes while continuously rotating, the cholesteric liquid crystal layer has regions in which rotation directions of the optical axis derived from the liquid crystal compound are opposite to each other.

5. The optical element according to claim 1,
   wherein the liquid crystal alignment pattern of the cholesteric liquid crystal layer is a concentric circular pattern having a concentric circular shape where the in-plane direction in which the direction of the optical axis derived from the liquid crystal compound changes while continuously rotating moves from an inside toward an outside.

6. The optical element according to claim 1,
   wherein the cholesteric liquid crystal layer has a selective reflection center wavelength in an infrared range.

7. A sensor comprising:
   the optical element according to claim 1;
   a light source; and
   a light-receiving element.

8. The sensor according to claim 7, comprising: an absorber that absorbs at least a part of light transmitted through the optical element.

9. The sensor according to claim 7, wherein the light source emits a pulse wave.

* * * * *